(12) United States Patent
Sun et al.

(10) Patent No.: US 8,421,274 B2
(45) Date of Patent: Apr. 16, 2013

(54) WIRELESS ENERGY TRANSFER SYSTEM

(75) Inventors: Mingui Sun, Pittsburgh, PA (US);
Steven Hackworth, Pittsburgh, PA (US);
Robert Sclabassi, Gibsonia, PA (US);
Fei Zhang, Gaithersburg, MD (US);
Xiaoyu Liu, Pittsburgh, PA (US)

(73) Assignee: University of Pittsburgh-Of the Commonwealth System of Higher Education, Pittsburgh, PA (US)

(*) Notice: Subject to any disclaimer, the term of this patent is extended or adjusted under 35 U.S.C. 154(b) by 468 days.

(21) Appl. No.: 12/556,828

(22) Filed: Sep. 10, 2009

(65) Prior Publication Data

US 2011/0101788 A1 May 5, 2011

Related U.S. Application Data

(60) Provisional application No. 61/096,466, filed on Sep. 12, 2008, provisional application No. 61/165,134, filed on Mar. 31, 2009.

(51) Int. Cl.
*H01F 27/42* (2006.01)
*H01F 37/00* (2006.01)
*H01F 38/00* (2006.01)

(52) U.S. Cl.
USPC ............ 307/104; 336/198; 336/206; 336/219

(58) Field of Classification Search .................. 307/104; 336/198, 206, 219
See application file for complete search history.

(56) References Cited

U.S. PATENT DOCUMENTS 6,960,968 B2 * 11/2005 Odendaal et al. ............. 333/219
2007/0222542 A1 9/2007 Joannopoulos et al.
2008/0278264 A1 11/2008 Karalis et al.
2009/0224856 A1 * 9/2009 Karalis et al. ............... 333/219.2
2009/0298553 A1 * 12/2009 Ungari et al. ................. 455/573

OTHER PUBLICATIONS

Sun, M., et al., "Passing Data and Supplying Power to Neural Implants," IEEE Engineering in Medicine and Biology Magazine, Sep./Oct. 2006, pp. 39-46.
Kurs, A. et al., "Wireless Power Transfer via Strongly Coupled Magnetic Resonances," www.sciencemag.org, Science, vol. 317, 6, Jul. 2007, pp. 83-86.
Donelan, J.M. et al., "Biomechanical Energy Harvesting: Generating Electricity During Walking with Minimal User Effort," Science, vol. 319, Feb. 8, 2008, pp. 807-810.

(Continued)

*Primary Examiner* — Rexford Barnie
*Assistant Examiner* — Toan Vu
(74) *Attorney, Agent, or Firm* — Eckert Seamans Cherin & Mellott, LLC; Philip E. Levy

(57) ABSTRACT

A wireless energy transfer system includes a first energy transfer unit having at least one resonant frequency, a second energy transfer unit having the at least one resonant frequency, and a load. The first wireless energy transfer unit includes a first coil magnetically coupled to a first wireless energy transfer cell, and the second wireless energy transfer unit includes a second coil magnetically coupled to a second wireless energy transfer cell. The first coil receives first energy and through the magnetic coupling between the first coil and the first wireless energy transfer cell, the first wireless energy transfer cell is caused to generate second energy, wherein the second wireless energy transfer cell receives the second energy and through the magnetic coupling between the second wireless energy transfer cell and the second coil, the second coil is caused to provide third electromagnetic wave energy to the load.

27 Claims, 20 Drawing Sheets

OTHER PUBLICATIONS

Karalis, A. et al., "Efficient wireless non-radiative mid-range energy transfer," Center for Materials Engineering and Research Laboratory of Electronics, 19 pp.

Karalis, A. et al., "Wireless Non-Radiative Energy Transfer," 24 pp.

Zhai, J. et al., "Magnetoelectric Laminate Composites: An Overview," J. Am. Ceram. Soc., 91[2] 351-358 (2008).

Zou, J. et al., "Development of Three-Dimensional Inductors Using Plastic Deformation Magnetic Assembly (PDMA)," IEEE Transactions on Microwave Theory and Techniques, vol. 51, No. 4, Apr. 2003, pp. 1067-1075.

Ooi, B. et al., "A Comprehensive Explanation on the High Quality Characteristics of Symmetrical Octagonal Spiral Inductor," 2003 IEEE Radio Frequency Integrated Circuits Symposium.

Lui, W. et al., "Implantable Biomimetic Microelectronic Systems Design, Systems, Components, and Signal Processing," IEEE Engineering in Medicine and Biology Magazine, Sep./Oct. 2005, pp. 66-74.

Heetderks, W.J., "RF Powering of Millimeter- and Submillimeter-Sized Neural Prosthetic Implants," IEEE Transactions on Biomedical Engineering, vol. 35, No. 5, May 1988, pp. 323-327.

* cited by examiner

WIRELESS ENERGY TRANSFER SYSTEM

CROSS-REFERENCE TO RELATED APPLICATION

This application claims priority under 35 U.S.C. §119(e) from U.S. Provisional Application No. 61/096,466, entitled "Apparatus for Wireless Power and Data Transfer Over a Distance," which was filed on Sep. 12, 2008, and U.S. Provisional Application No. 61/165,134, entitled "Wireless Energy Transfer System," which was filed on Mar. 31, 2009, the disclosures of which are incorporated herein by reference.

GOVERNMENT CONTRACT

This work was supported in part by Army grant No. W81XWH05-C-0047. The United States government may have certain rights in the invention described herein.

FIELD OF THE INVENTION

The present invention relates to the transfer of energy wirelessly, and in particular to a wireless energy transfer system, and wireless energy transfer units and cells employed thereby, that allows energy, such as RF energy, to be transferred wirelessly using nonradiative resonant coupling for power transfer and/or data communications purposes.

BACKGROUND OF THE INVENTION

In recent years, rapid technological advances in microelectronics, nanotechnology and MEMS technology have spurred new types of micro devices and sensors, such as RFID, micro cameras, accelerometers, miniature implantable devices, and micro chemical sensors, playing important roles in industrial automation, military applications, homeland security, environmental monitoring, and biomedicine. These technological advances have also resulted in significant impacts on people's daily lives. For example, mobile electronic devices, such as the laptop computer, cell phone, and personal media player, have become an inseparable part of many people. All these electronic devices rely on electrical energy to power their circuits, and most of them require a communication channel to exchange information with certain host devices, computers or systems. Currently, batteries and wireless technologies are utilized for these purposes. However, in many cases, these solutions are inadequate. For example, running out of battery power in a laptop or a cell phone when a recharging procedure is missed is an unpleasant, but common event. It would be highly desirable if, when a laptop, cell phone, media player or other electronic device is located within a "hot spot", a wireless router will not only transmit/receive information, but also recharge these devices. With such a technology, these personal devices will not need manual recharging, and their batteries can be made smaller since they are recharged more frequently. Such a wireless energy transfer technology could also be used in other consumer and industrial applications, such as transferring power from a solar panel outside a residential house to the inside without a cable through the construction wall or roof, powering devices or systems inside a sealed, pressured, or vacuum container of either air or liquid, powering and guiding a robot or a vehicle by a series of thin energy cells under the floor or paved road, recharging an electric car by a low-profile wireless charger "mat" on the garage floor, or transferring solar energy to the inside of a parked car to power ventilation fans in order to keep the inside temperature from rising too high, to name just a few.

In the medical field, microelectronic devices can be implanted within the human body to perform a variety of therapeutic, prosthetic, and diagnostic functions. The deep brain stimulation (DBS) device, for example, is used as a brain implant for treating Parkinson's disease and essential tremor. Currently, a surgical procedure is required to replace the entire device when its battery power is depleted. The combined cost for this procedure is approximately $25,000, which has been described as "the world's most expensive battery change." Wireless energy transfer technology can eliminate the need for these costly replacements.

One particular medical problem of high interest is the design of a wireless network of devices for the human body. Current and future wireless sensors will be able to be patched on the skin or the underside of clothes to perform a variety of important tasks, such as monitoring vital signs and levels of physical activity. Microsensors may also be implanted by either surgery or injection into the inside of the body to perform additional tasks, such as restoring lost vision, hearing, and motor functions, releasing drugs, and monitoring cancer or cardiovascular diseases. In the military, a body sensor network embedded within the clothes is highly desirable since it can potentially produce warning signals of imminent attacks, detect the presence of people or objects of interest, monitor chemicals in the air, evaluate wounds, and communicate with a central station or an assistive device such as a rescue robot.

While the high significance of such a body network has been recognized by both the research community and industry, the problem of providing power and communication functions to a highly distributed network of electronic devices without wired connections and batteries has not been solved.

SUMMARY OF THE INVENTION

In one embodiment, the invention provides a wireless energy transfer system that includes a first wireless energy transfer unit having at least one resonant frequency, a second wireless energy transfer unit having the at least one resonant frequency, and a load. The first wireless energy transfer unit includes a first coil magnetically coupled to a first wireless energy transfer cell, wherein the first wireless energy transfer cell comprises a first LC resonant tank including a first conductor coil coupled to at least one first insulator, and wherein the at least one first insulator forms a part of at least one capacitor of the first LC resonant tank. The second wireless energy transfer unit includes a second coil magnetically coupled to a second wireless energy transfer cell, wherein the second wireless energy transfer cell comprises a second LC resonant tank including a second conductor coil coupled to at least one second insulator, and wherein the at least one second insulator forms a part of at least one capacitor of the second LC resonant tank. The first coil receives first electromagnetic wave energy, wherein in response to receipt of the first electromagnetic wave energy and through the magnetic coupling between the first coil and the first wireless energy transfer cell the first wireless energy transfer cell is caused to generate second electromagnetic wave energy, wherein the second wireless energy transfer cell receives the second electromagnetic wave energy, wherein in response to receipt of the second electromagnetic wave energy and through the magnetic coupling between the second wireless energy transfer cell and the second coil the second coil is caused to provide third electromagnetic wave energy to the load. In one particular embodiment, the second electromagnetic wave energy is generated in a first nonradiative near field of the first wireless energy transfer cell, and the second electromagnetic wave energy is received in a second nonradiative near field of the second wireless energy transfer cell, wherein the first nonradiative near field overlaps the second nonradiative near field. The first wireless energy transfer unit may have a plurality of resonant frequencies and the second wireless energy transfer unit may also have the plurality of resonant frequencies.

In one particular embodiment, the first wireless energy transfer unit has at least a first resonant frequency and a second resonant frequency, and the second wireless energy transfer unit also has the first resonant frequency and the second resonant frequency, wherein the first, second and third electromagnetic energies are each at the first resonant frequency and the third electromagnetic energy is used to provide power to at least a portion of the load. In addition, the first coil receives fourth electromagnetic wave energy at the second resonant frequency, wherein in response to receipt of the fourth electromagnetic wave energy and through the magnetic coupling between the first coil and the first wireless energy transfer cell the first wireless energy transfer cell is caused to generate fifth electromagnetic wave energy at the second resonant frequency, wherein the second wireless energy transfer cell receives the fifth electromagnetic wave energy, wherein in response to receipt of the fifth electromagnetic wave energy and through the magnetic coupling between the second wireless energy transfer cell and the second coil the second coil is caused to provide sixth electromagnetic wave energy at the second resonant frequency to the load, and wherein the fourth, fifth and sixth electromagnetic wave energies are used to communicate information to the load. Also, the fourth electromagnetic wave energy may be modulated based on the information.

In another embodiment, the invention provides a wireless energy transfer unit having at least one resonant frequency that includes an energy coupling/extraction coil, and a wireless energy transfer cell magnetically coupled to the energy coupling/extraction coil. The wireless energy transfer cell comprises an LC resonant tank including a conductor coil coupled to at least one insulator, wherein the at least one insulator forms a part of at least one capacitor of the LC resonant tank. The energy coupling/extraction coil may comprise a single loop coil or a plurality of loops.

In one particular embodiment, the at least one insulator includes a first surface and a second surface opposite the first surface, wherein the conductor coil is coupled to the first surface, wherein the LC resonant tank further includes a plurality of conductive strips coupled to the second surface, and wherein the conductor coil, the at least one insulator and the plurality of conductive strips form the at least one capacitor of the LC resonant tank. The at least one insulator may be a cylindrical insulator, wherein the conductor coil is a helical conductor coil. In one particular embodiment, each of the conductive strips covers only two adjacent portions of the helical conductor coil. The at least one insulator may also be a flat insulator, wherein the conductor coil is a flat conductor coil and wherein each of the plurality of conductive strips is a flat conductive strip. The conductor coil may be a square spiral or a circular spiral. In another alternative, the conductor coil includes a plurality of crisscrossing portions along a length thereof such that a beginning and an end of the conductor coil are positioned adjacent to one another.

In still another particular embodiment, the at least one insulator includes a first surface and a second surface opposite the first surface, wherein the conductor coil is coupled to the first surface, wherein the LC resonant tank further includes a second conductor coil coupled to the second surface, wherein the conductor coil and the second conductor coil are electrically coupled to one another, and wherein the conductor coil, the at least one insulator and the second conductor form the at least one capacitor of the LC resonant tank. The conductor coil and the second conductor coil may be positioned on the insulator such that they overlap and correspond to one another as they wind around the insulator. Also, the at least one insulator may be a cylindrical insulator, wherein the conductor coil and the second conductor coil are each a helical conductor coil, or, alternatively, the at least one insulator may be a rectangular insulator, wherein the conductor coil and the second conductor coil are each a rectangular conductor coil.

In another embodiment, the at least one insulator includes an outer cylindrical insulator and an inner cylindrical insulator, the outer cylindrical insulator and the inner cylindrical insulator being structured to rotate relative to one another, wherein the LC resonant tank further includes a first conductor sheet coupled to the outer cylindrical insulator and a second conductor sheet coupled to the inner cylindrical insulator, wherein the outer cylindrical insulator, the inner cylindrical insulator, the first conductor sheet and the second conductor sheet form the at least one capacitor, wherein a capacitance of the at least one capacitor may be varied by rotating the outer cylindrical insulator and the inner cylindrical insulator relative to one another, and wherein the conductor coil is a helical conductor coil having a first end coupled to the first conductor sheet and a second end coupled to the second conductor sheet. Preferably, the first conductor sheet extends along about 50% of the outer cylindrical insulator and the second conductor sheet extends along about 50% of the inner cylindrical insulator to provide maximum variability of the at least one capacitor.

In still another embodiment, the at least one insulator is a cylindrical insulator, wherein the LC resonant tank further includes a first conductor ring coupled to an inner surface of the cylindrical insulator and a second conductor ring coupled to an outer surface of the cylindrical insulator, wherein the first conductor ring has a first gap formed therein and the second conductor ring has a second gap formed therein, wherein the cylindrical insulator, the first conductor ring and the second conductor ring form the at least one capacitor, wherein the conductor coil is a helical conductor coil having a first end coupled to the first conductor ring and a second end coupled to the second conductor ring, and wherein the LC resonant tank further includes a ferromagnetic core provided within the conductor coil. The ferromagnetic core may comprise a plurality of ferromagnetic discs.

In another particular embodiment, the at least one insulator is an insulator film, wherein the LC resonant tank further includes a first metal film coupled to a top surface of the insulator film and a second metal film coupled to a bottom surface of the insulator film, wherein the insulator film, the first metal film and the second metal film form the at least one capacitor, and wherein the conductor coil is a planar conductor coil having a first end coupled to the first metal film and a second end coupled to the second metal film. The planar conductor coil may include a plurality of crisscrossing portions along a length thereof such that the first end and the second end are positioned adjacent to one another.

In still another embodiment, the invention provides a wireless energy transfer system that includes a transmitter wireless energy transfer unit having at least one resonant frequency, a receiver wireless energy transfer unit having the at least one resonant frequency, a number of relay units, and a load. The transmitter wireless energy transfer unit includes a first coil magnetically coupled to a first wireless energy transfer cell, the first wireless energy transfer cell comprising a first LC resonant tank including a first conductor coil coupled to at least one first insulator, wherein the at least one first insulator forms a part of at least one capacitor of the first LC resonant tank. The receiver wireless energy transfer unit includes a second coil magnetically coupled to a second wireless energy transfer cell, the second wireless energy transfer cell comprising a second LC resonant tank including a second conductor coil coupled to at least one second insulator, wherein the at least one second insulator forms a part of at least one capacitor of the first LC resonant tank. Also, each relay unit has a relay wireless energy transfer cell comprising a relay LC resonant tank including a relay conductor coil coupled to at least one relay insulator, wherein the at least one relay insulator forms a part of at least one capacitor of the relay LC resonant tank. In this embodiment, the first coil receives first electromagnetic wave energy, wherein in response to receipt of the first electromagnetic wave energy and through the magnetic coupling between the first coil and the first wireless energy transfer cell the first wireless energy transfer cell is caused to generate second electromagnetic wave energy, wherein the number of relay units in response to receipt of the second electromagnetic wave energy cause third electromagnetic wave energy to be generated, wherein the second wireless energy transfer cell receives the third electromagnetic wave energy, wherein in response to receipt of the third electromagnetic wave energy and through the magnetic coupling between the second wireless energy transfer cell and the second coil the second coil is caused to provide fourth electromagnetic wave energy to the load. In one particular embodiment, the transmitter wireless energy transfer unit, the number of relay units and the receiver wireless energy transfer unit are arranged in a linear fashion. In another particular embodiment, the transmitter wireless energy transfer unit, the number of relay units and the receiver wireless energy transfer unit are arranged in a non-linear fashion.

The number of relay units may comprise a plurality of relay units arranged in the form of a two-dimensional array or a three-dimensional array.

The invention also provides a wireless energy transfer method that includes steps of (i) receiving first electromagnetic wave energy in a first conductor, preferably a coil, having a resonant frequency, (ii) in response to receiving the first electromagnetic wave energy, causing a first wireless energy transfer cell to generate second electromagnetic wave energy having the resonant frequency through magnetic coupling between the first conductor and the first wireless energy transfer cell, the first wireless energy transfer cell comprising a first LC resonant tank including a first conductor coil coupled to at least one first insulator, wherein the at least one first insulator forms a part of at least one capacitor of the first LC resonant tank, (iii) receiving the second electromagnetic wave energy in a second wireless energy transfer cell, the second wireless energy transfer cell comprising a second LC resonant tank including a second conductor coil coupled to at least one second insulator, wherein the at least one second insulator forms a part of at least one capacitor of the second LC resonant tank, and (iv) in response to receiving the second electromagnetic wave energy, causing a second conductor, preferably a coil, to provide third electromagnetic wave energy to a load through magnetic coupling between the second wireless energy transfer cell and the second conductor. Preferably, the second electromagnetic wave energy is generated in a first nonradiative near field of the first wireless energy transfer cell, and the second electromagnetic wave energy is received in a second nonradiative near field of the second wireless energy transfer cell, wherein the first nonradiative near field overlaps the second nonradiative near field.

The method may further include steps of (i) receiving fourth electromagnetic wave energy in the first conductor, the first conductor also having a second resonant frequency different than the resonant frequency, (ii) in response to receiving the fourth electromagnetic wave energy, causing the first wireless energy transfer cell to generate fifth electromagnetic wave energy having the second resonant frequency through magnetic coupling between the first conductor and the first wireless energy transfer cell, (iii) receiving the fifth electromagnetic wave energy in the second wireless energy transfer cell, and (iv) in response to receiving the fifth electromagnetic wave energy, causing the second conductor to provide sixth electromagnetic wave energy to the load through magnetic coupling between the second wireless energy transfer cell and the second conductor. In this embodiment, the third electromagnetic energy is used to provide power to at least a portion of the load and the fourth, fifth and sixth electromagnetic wave energies are used to communicate information to the load.

In another embodiment, a wireless sensor network is provided that includes a first wireless energy transfer unit having at least one resonant frequency, a second wireless energy transfer unit having the at least one resonant frequency, and a sensor coupled to the second wireless energy transfer unit. The first wireless energy transfer unit includes a first coil magnetically coupled to a first wireless energy transfer cell, the first wireless energy transfer cell comprising a first LC resonant tank including a first conductor coil coupled to at least one first insulator, wherein the at least one first insulator forms a part of at least one capacitor of the first LC resonant tank. The second wireless energy transfer unit including a second coil magnetically coupled to a second wireless energy transfer cell, the second wireless energy transfer cell comprising a second LC resonant tank including a second conductor coil coupled to at least one second insulator, wherein the at least one second insulator forms a part of at least one capacitor of the second LC resonant tank. The sensor is coupled to the second coil of the second wireless energy transfer unit. The first coil receives first electromagnetic wave energy, and in response to receipt of the first electromagnetic wave energy and through the magnetic coupling between the first coil and the first wireless energy transfer cell the first wireless energy transfer cell is caused to generate second electromagnetic wave energy. The second wireless energy transfer cell receives the second electromagnetic wave energy, and in response to receipt of the second electromagnetic wave energy and through the magnetic coupling between the second wireless energy transfer cell and the second coil the second coil is caused to provide third electromagnetic wave energy to the sensor. The third electromagnetic energy is used to provide power to the sensor.

In one particular embodiment, both power and information is provided to the sensor. Specifically, the first wireless energy transfer unit and the second wireless energy transfer unit both have at least a first resonant frequency and a second resonant frequency different that the first resonant frequency. The first, second and third electromagnetic energies are each at the first resonant frequency, and the first coil receives fourth electromagnetic wave energy at the second resonant frequency. In response to receipt of the fourth electromagnetic wave energy and through the magnetic coupling between the first coil and the first wireless energy transfer cell the first wireless energy transfer cell is caused to generate fifth electromagnetic wave energy at the second resonant frequency, wherein the second wireless energy transfer cell receives the fifth electromagnetic wave energy, wherein in response to receipt of the fifth electromagnetic wave energy and through the magnetic coupling between the second wireless energy transfer cell and the second coil the second coil is caused to provide sixth electromagnetic wave energy at the second resonant frequency to the sensor. The fourth, fifth and sixth electromagnetic wave energies are used to communicate information to the sensor.

In another particular embodiment, power is provided to the sensor and information is received from the sensor. Specifically, the first wireless energy transfer unit and the second wireless energy transfer unit both have at least a first resonant frequency and a second resonant frequency different than the first resonant frequency. The first, second and third electromagnetic energies are each at the first resonant frequency, and the second coil receives fourth electromagnetic wave energy at the second resonant frequency, wherein in response to receipt of the fourth electromagnetic wave energy and through the magnetic coupling between the second coil and the second wireless energy transfer cell the second wireless energy transfer cell is caused to generate fifth electromagnetic wave energy at the second resonant frequency, wherein the first wireless energy transfer cell receives the fifth electromagnetic wave energy, wherein in response to receipt of the fifth electromagnetic wave energy and through the magnetic coupling between the first wireless energy transfer cell and the first coil the first coil is caused to provide sixth electromagnetic wave energy at the second resonant frequency to a data collection unit. The fourth, fifth and sixth electromagnetic wave energies are used to communicate information from the sensor to the data collection unit.

The wireless sensor network may also include a third wireless energy transfer unit having the at least one resonant frequency, the third wireless energy transfer unit including a third coil magnetically coupled to a third wireless energy transfer cell, the third wireless energy transfer cell comprising a third LC resonant tank including a third conductor coil coupled to at least one third insulator, wherein the at least one third insulator forms a part of at least one capacitor of the third LC resonant tank. The network in this embodiment also includes a second sensor coupled to the third conductor coil. The third wireless energy transfer cell receives the second electromagnetic wave energy, and in response to receipt of the second electromagnetic wave energy and through the magnetic coupling between the third wireless energy transfer cell and the third coil the third coil is caused to provide electromagnetic wave energy to the second sensor that is used to provide power to the second sensor.

The wireless sensor network may be a body sensor network adapted to acquire data relating to physiological or physical parameters of a subject, wherein the sensor is structured to generate the data relating to physiological or physical parameters of the subject. The first wireless energy transfer unit in this embodiment is structured to be worn by the subject, and the sensor is structured to be attached externally to a body of the subject or implanted in the body of the subject. Preferably, the second wireless energy transfer cell is structured to be attached externally to the body of the subject. In one preferred embodiment, the at least one second insulator includes a first surface and a second surface opposite the first surface, wherein the second conductor coil is coupled to the first surface, wherein the LC resonant tank further includes a plurality of conductive strips coupled to the second surface, wherein the second conductor coil, the at least one second insulator and the plurality of conductive strips form the at least one capacitor of the second LC resonant tank, wherein the at least one second insulator is a flat insulator, and wherein the second conductor coil is a flat conductor coil and each of the plurality of conductive strips is a flat conductive strip.

In still another embodiment, the invention provides a wireless energy transfer unit having at least one resonant frequency that includes an energy coupling/extraction conductor, such as a coil, and a multi-layer wireless energy transfer cell magnetically coupled to the energy coupling/extraction conductor. The multi-layer wireless energy transfer cell includes a top layer and a bottom layer, the top layer and the bottom layer being made of a magneto-electric material that produces an electric field when exposed to a magnetic field, a first conductor layer forming a first electrode positioned adjacent to the top layer, a second conductor layer forming a second electrode positioned adjacent to the bottom layer, and a central layer positioned between the first conductor layer and the second conductor layer, the central layer being made of a piezoelectric material which resonates in response to an electric field being applied thereto by the first conductor layer and the second conductor layer.

In still another embodiment, the invention provides, a wireless energy transfer unit is provided that includes an energy coupling/extraction conductor, and a multi-layer wireless energy transfer cell magnetically coupled to the energy coupling/extraction conductor. The multi-layer wireless energy transfer cell includes a first coil element including a first insulator layer and a first conductor coil provided on the first insulator layer, the first conductor coil including a plurality of first crisscrossing portions along a length thereof such that a first beginning and a first end of the first conductor coil are positioned adjacent to one another, a second coil element including a second insulator layer and a second conductor coil provided on the second insulator layer, the second conductor coil including a plurality of second crisscrossing portions along a length thereof such that a second beginning and a second end of the second conductor coil are positioned adjacent to one another, and an insulator element made of an insulating material provided between the first coil element and the second coil element. The first coil element and the second coil element are electrically connected to one another, preferably through the insulator element. Also, in the preferred embodiment, the multi-layer wireless energy transfer cell further includes a third coil element including a third insulator layer and a third conductor coil provided on the third insulator layer, the third conductor coil including a plurality of third crisscrossing portions along a length thereof such that a third beginning and a third end of the third conductor coil are positioned adjacent to one another, and a second insulator element made of an insulating material provided between the second coil element and the third coil element, wherein the second coil element and the third coil element are electrically connected to one another, preferably through the second insulator element. The first coil element, the second coil element, the third coil element, the insulator element, and the second insulator element may all be disk-shaped. Also, the first conductor coil, the second conductor coil and the third conductor coil may each be film coils.

In another particular embodiment, the invention provides a wireless energy transfer unit that includes an energy coupling/extraction conductor, and a multi-layer cylindrical wireless energy transfer cell magnetically coupled to the energy coupling/extraction conductor. The multi-layer cylindrical wireless energy transfer cell includes an inner cylindrical insulator, a first spiral conductor coil provided on a surface of the inner cylindrical insulator, an insulator layer provided on top of the first spiral conductor coil, and a second spiral conductor coil provided on a surface of the insulator layer, wherein the second spiral conductor coil is electrically connected to the first spiral conductor coil. Preferably, the first spiral conductor coil is oriented in one of a positive angle and a negative angle with respect to a longitudinal axis of the inner cylindrical insulator, and the second spiral conductor coil is oriented in the other of the positive angle and the negative angle with respect to the longitudinal axis of the inner cylindrical insulator. Also, in the preferred embodiment, the first spiral conductor coil includes a plurality of first enlarged portions along a length thereof, the second spiral conductor coil includes a plurality of second enlarged portions along a length thereof, and each of the second enlarged portions corresponds to and overlaps a respective one of the first enlarged portions. Each of the first enlarged portions and each of the second enlarged portions may be disk-shaped. Also, the multi-layer cylindrical wireless energy transfer cell may further include a ferrite core provided inside the inner cylindrical insulator.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
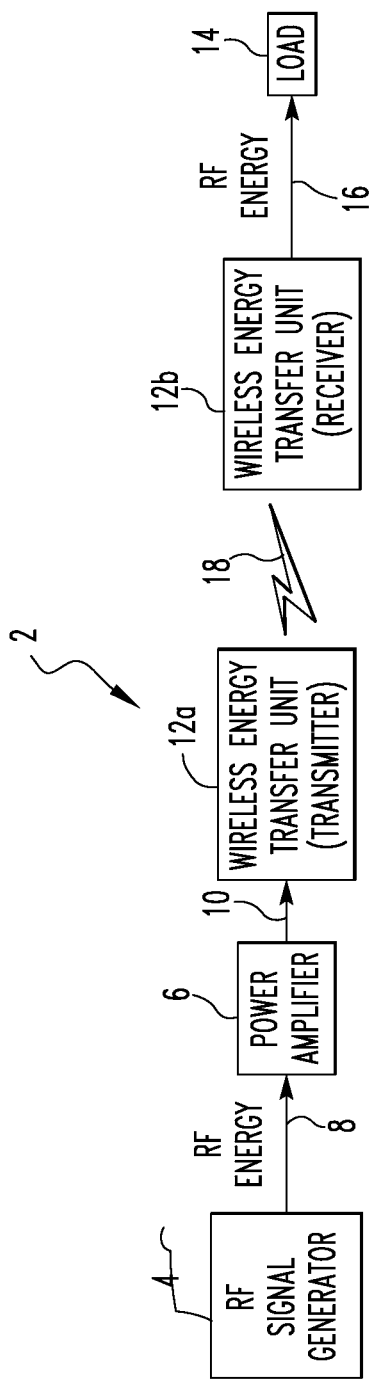
FIG. 1 is a block diagram of a wireless energy transfer system according to one embodiment of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a block diagram of a wireless energy transfer system 2 according to one embodiment of the present invention. As described in greater detail elsewhere herein, the wireless energy transfer system 2 allows energy for use in providing power and/or data communications to be transferred wirelessly from a source to a load based on the concept of evanescent resonant coupling mediated through the overlap of the nonradiative near (e.g., magnetic) fields of two resonators (referred to as nonradiative resonant coupling). In particular, in the scheme employed by the wireless energy transfer system 2, the coupling is not implemented using the lossy radiative far-field, but rather is implemented using the evanescent non-lossy stationary near-field.

Referring to FIG. 1, the wireless energy transfer system 2 includes an RF signal generator 4 operatively coupled to a power amplifier 6. The RF signal generator 4 generates an RF energy signal 8, which is amplified by the power amplifier 6 to produce amplified RF energy signal 10. The wireless energy transfer system 2 also includes a first wireless energy transfer unit 12a acting as an energy transmitter and a second wireless energy transfer unit 12b separated from the first wireless energy transfer unit 12a and acting as a receiver. The first wireless energy transfer unit 12a and the second wireless energy transfer unit 12b are described in greater detail elsewhere herein and have the same resonant frequency or frequencies. A load 14 is operatively coupled to the second wireless energy transfer unit 12b for receiving RF energy 16 (in the one or more resonant frequencies) therefrom.

In operation, as shown schematically in FIG. 1, the first wireless energy transfer unit 12a receives the amplified RF energy signal 10 and in response thereto and in a manner described elsewhere herein, causes RF energy 18 to be wirelessly transmitted between the first wireless energy transfer unit 12a and the second wireless energy transfer unit 12b in the evanescent non-lossy stationary near-field. In response to receiving the RF energy 18 and in a manner described elsewhere herein, the second wireless energy transfer unit 12b outputs RF energy 16, which is received by the load 14. In one embodiment, the load 14 includes a rectifier for converting the received RF energy 16 to DC power for powering the load (as described elsewhere herein, the RF energy 18 may have multiple frequencies and as a result may also include communication information).

Figure 2:
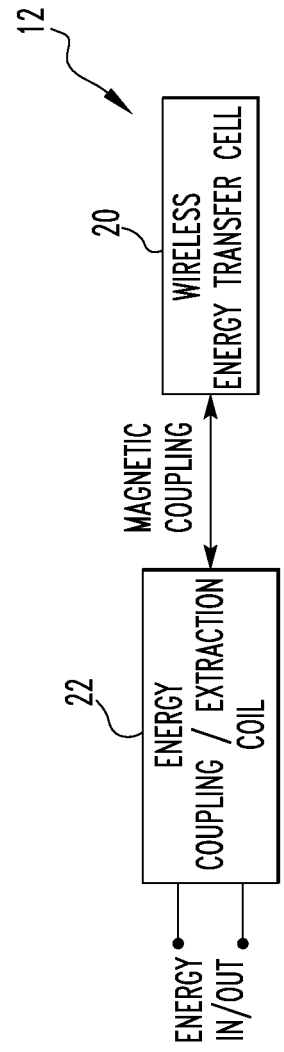
FIG. 2 is a block diagram of an embodiment of a general wireless energy transfer unit that may be employed in, for example, the system of FIG. 1.

FIG. 2 is a block diagram of an embodiment of a general wireless energy transfer unit 12 that may be used for the first wireless energy transfer unit 12a and the second wireless energy transfer unit 12b. As seen in FIG. 2, the wireless energy transfer unit 12 includes a wireless energy transfer cell 20, a number of particular embodiments of which are described herein, that is magnetically coupled to an energy coupling/extraction coil 22 comprising a conductor formed into one or more loops, and can include a single loop or a continuous series of loops. The wireless energy transfer cell 20 includes a single or multiple LC resonant tanks having one or more conductors coupled to an insulator. As noted above, the wireless energy transfer unit 12 can function as either a transmitter or a receiver. When functioning as a transmitter, RF energy (or some other form of energy, such as, without limitation, another form of electromagnetic wave energy) of a particular frequency or frequencies is applied to the energy coupling/extraction coil 22 by, for example, a wired connection. The applied RF energy, through magnetic coupling between the energy coupling/extraction coil 22 and the wireless energy transfer cell 20, causes RF energy of the same particular frequency or frequencies to be induced in and radiated by the wireless energy transfer cell 20, and in particular the LC resonant tank or tanks thereof. When functioning as a receiver, the wireless energy transfer cell 20 will receive RF energy of a particular frequency or frequencies, as determined by the resonance properties of the LC resonant tank or tanks thereof The received RF energy (which is present in the area surrounding the wireless energy transfer cell 20), through magnetic coupling between the wireless energy transfer cell 20 and the energy coupling/extraction coil 22, causes RF energy of the same particular frequency or frequencies to be induced in the energy coupling/extraction coil 22 that is present in the area surrounding the wireless energy transfer cell 20. That RF energy may be transmitted to a load, such as load 14, by making an appropriate connection to the energy coupling/extraction coil 22.

Figure 3A:
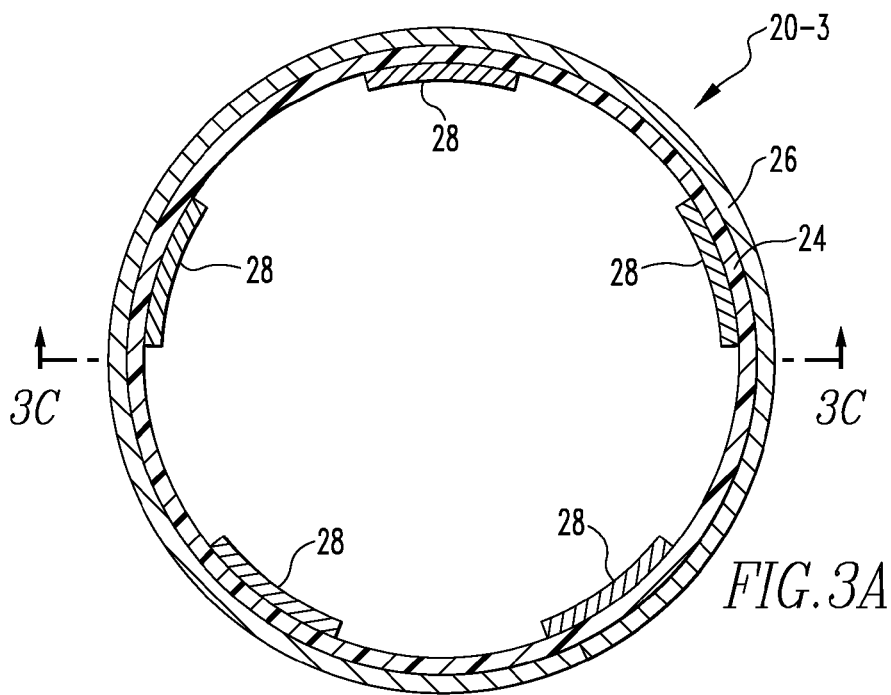
FIGS. 3A, 3B and 3C are top plan, side elevational and cross-sectional views, respectively, of one particular embodiment of a wireless energy transfer cell that may be employed in the wireless energy transfer units describe herein.
Figure 3B:
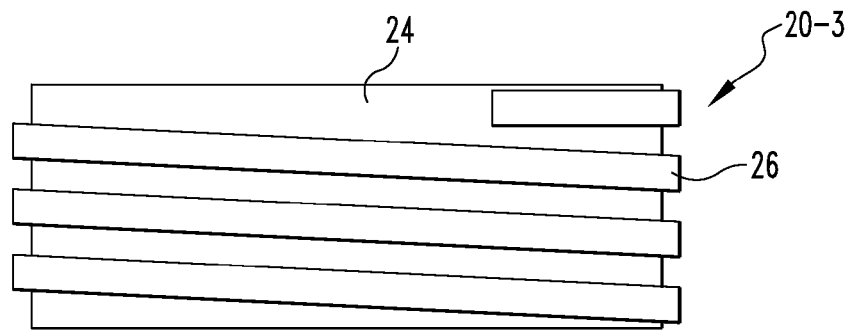
Figure 3C:
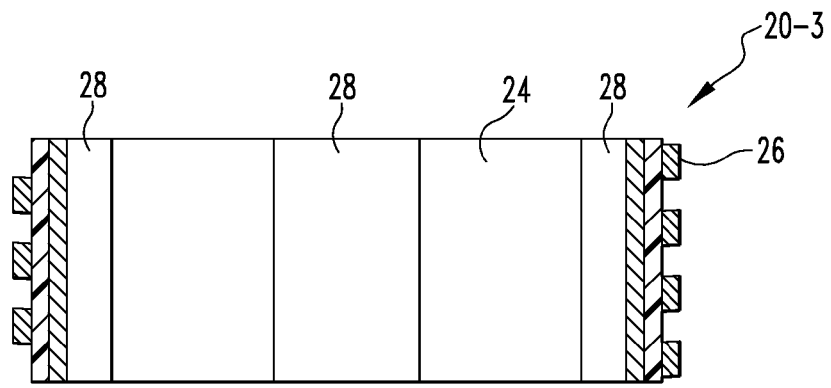

FIGS. 3A and 3B are top plan and side elevational views, respectively, of one particular embodiment of a wireless energy transfer cell 20-3. FIG. 3C is a cross-sectional view of the wireless energy transfer cell 20-3 taken along lines C-C of FIG. 3A. As described in greater detail below, the wireless energy transfer cell 20-3 is a thin film cell design that, in a situation where it is used to function as a receiver as described elsewhere herein, can be imbedded, or imprinted, on the exterior or interior cover (or container) of another device (e.g., the load 14). The particular design in FIGS. 3A-3C not only utilizes the maximum dimensions of the associated (parent) device to capture the magnetic flux produced by the distally located transmitter wireless energy transfer unit 12, but also takes no interior space of the associated (parent) device. In the particular embodiment shown in FIGS. 3A-3C, the wireless energy transfer cell 20-3 is circular (cylindrical) in shape in order to correspond to an associated (parent) device that is circular (cylindrical) in shape. It is to be understood that this is meant to be exemplary only, and that the wireless energy transfer cell 20-3 may take on other shapes (e.g., rectangular) in order to correspond to associated (parent) devices of other shapes.

As seen in FIGS. 3A-3C, the wireless energy transfer cell 20-3 includes three layers. The interior layer is an insulator layer 24 made of, for example and without limitation, a polymer. The insulator layer 24 serves as an insulator between the conductive exterior and interior layers described below. The exterior layer is a helical conductor coil 26 surrounding and coupled to the outer surface of the insulator layer 24. The helical conductor coil 26 forms an inductor which captures and generates the magnetic field. The interior layer includes a number of conductive strips 28 spaced around and coupled to the inner surface of the insulator layer 24 in an orientation that is generally parallel with the central axis of the wireless energy transfer cell 20-3. The conductive strips 28 form physical capacitors with the overlapped parts of the helical conductor coil 26 and divide the inductor formed by the helical conductor coil 26 into equal or unequal segments. Thus, the design of the wireless energy transfer cell 20-3 forms a compact LC tank circuit with no wire connections.

In order to reduce the weight and increase the pliability of the wireless energy transfer cell 20-3, the helical conductor coil 26 and the conductive strips 28 are in one specific implementation made of copper tape or another similar suitable conductive material. Also, the helical conductor coil 26 and/or the conductive strips 28 may have a large surface area thereof plated with silver in order to provide for small electrical resistance adapting to the skin effect of RF current.

In the particular embodiment of the wireless energy transfer cell 20-3, each conductive strip 28 covers all turns of the helical conductor coil 26 and provides connections for those capacitors that it forms. Different turns of the helical conductor coil 26 are then connected through the capacitors in the same strip, which configuration constructs resonance loops. As a result, the wireless energy transfer cell 20-3 forms a structure with multiple resonant frequencies. Thus, the wireless energy transfer cell 20-3 is able to simultaneously form both energy transfer channel or channels for power transmission and data transfer channel or channels for information exchange. For efficient energy transfer, the radius of the wireless energy transfer cell 20-3 and the number of turns of the helical conductor coil 26 should be designed so that the wireless energy transfer cell 20-3 can receive or emit a desired amount of energy. In addition, the number of the conductive strips 28 and their locations must be determined to form transmission channels within the frequency range or ranges of interest. Also, the width of the conductive strips 28 must be selected to obtain the desired resonant frequencies.

Figure 3D:
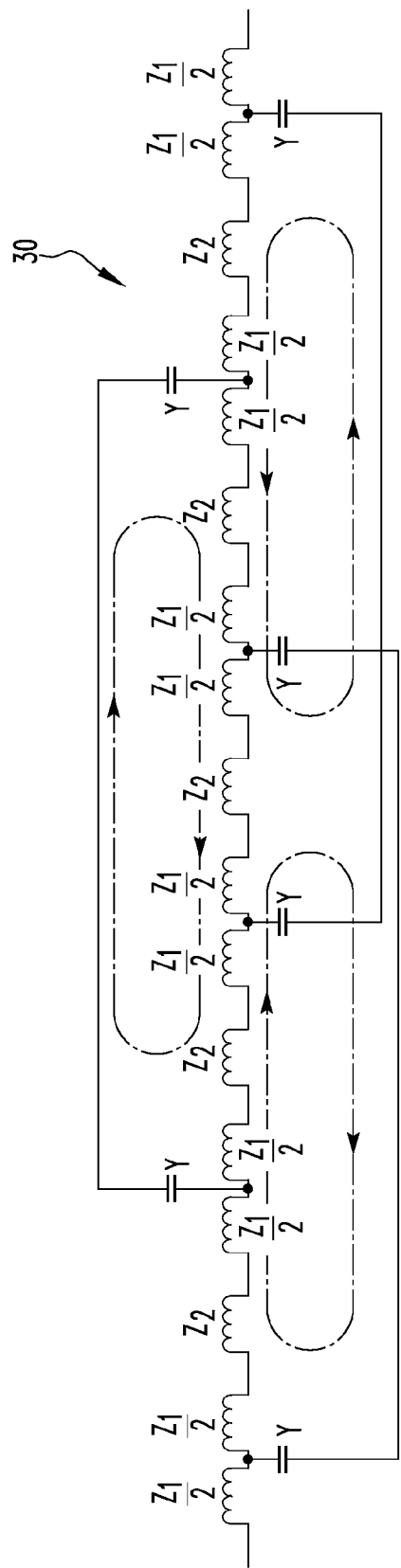
FIG. 3D is a simplified equivalent circuit model of a version of the wireless energy transfer cell shown in FIGS. 3A-3C.

FIG. 3D is a simplified equivalent circuit model 30 of a version of the wireless energy transfer cell 20-3 (losses are not taken into consideration). For simplicity, the circuit includes only two loops in the helical conductive coil 26 and three conductive strips 28. The segment of a part of the strips in both the exterior and interior layers can be modeled as a transmission line whose equivalent circuit is a T-circuit as indicated by impedance $$\frac{Z_1}{2}$$

and admittance Y. $Z_2$ is the impedance of the part without a strip at the interior layer. The impedances and the admittance are calculated using the following equations:

$$\frac{Z_1}{2} = \frac{Z_l}{2} \frac{\tanh(l_1 \sqrt{Z_l Y_l}/2)}{\sqrt{Z_l Y_l}/2} \quad (1)$$

$$Y = Y_l \frac{\sinh(l_1 \sqrt{Z_l Y_l})}{\sqrt{Z_l Y_l}} \quad (2)$$

$$Z_2 = Z_l l_2, \quad (3)$$

where $Z_1$, $Y_1$ are the impedance per unit length and admittance per unit length of the transmission line model, and $l_1$ and $l_2$ are the lengths of the segment with strips in both layers and the distance between two strips in the interior layer. In the above equations, the inductance in the interior layer of each segment is neglected since it is much smaller than that in the exterior layer, and therefore the distributed impedances are the same in each segment.

Mesh current analysis is used to solve the circuit. The left and right loops are symmetric and therefore only two mesh equations are needed. Denoting $I_1$ and $I_2$ as the mesh currents of the left loop and the middle loop, respectively, we have:

$$I_1 = \frac{V(2Z_C + Z_L)}{2(2Z_L^2 + 7Z_L Z_C + 2Z_C^2)},$$

and $$I_2 = \frac{VZ_C}{2Z_L^2 + 7Z_L Z_C + 2Z_C^2},$$

where $Z_L = Z_1 + Z_2$, $$Z_C = \frac{1}{Y}$$

and V is the voltage around the loop induced by the external field.

By setting $I_1 = \infty$ and $I_2 = \infty$, we get the condition for the circuit resonating:

$$(Z_1 + Z_2)Y = \frac{-7 \pm \sqrt{33}}{4}. \quad (4)$$

By replacing the parameters in (4) with the parameters in (1)-(3), the resonant condition becomes $$\left(Z_l \frac{\tanh(l_1 \sqrt{Z_l Y_l}/2)}{\sqrt{Z_l Y_l}/2} + Z_l l_2\right) Y_l \frac{\sinh(l_1 \sqrt{Z_l Y_l})}{\sqrt{Z_l Y_l}} = \frac{-7 \pm \sqrt{33}}{4} \quad (5)$$

Since $Z_l = j\omega L_l$ and $Y_l = j\omega C_l$, where $L_l$ and $C_l$ are the distributed inductance and capacitance, we can use equation (5) to determine the resonant frequency if the size of the design is provided. Conversely, if the resonant frequency is selected, we can determine the size of the design. There does not exist an analytical solution to determine resonant frequencies from Eq. (5). However, we can do so numerically, such as using the finite element method. As we can see from Eq. (5), there are at least two resonant frequencies in the circuit (observing the plus and minus signs to the right side). Again, it should be noted that the solution in (5) is for a special case only (two loops on the exterior and three strips in the interior). The inventors have not obtained a general solution for the circuit with an arbitrary number of loops and strips. However, the inventors predict that, by increasing the number of loops and strips, more resonant frequencies will be present.

Figure 4D:
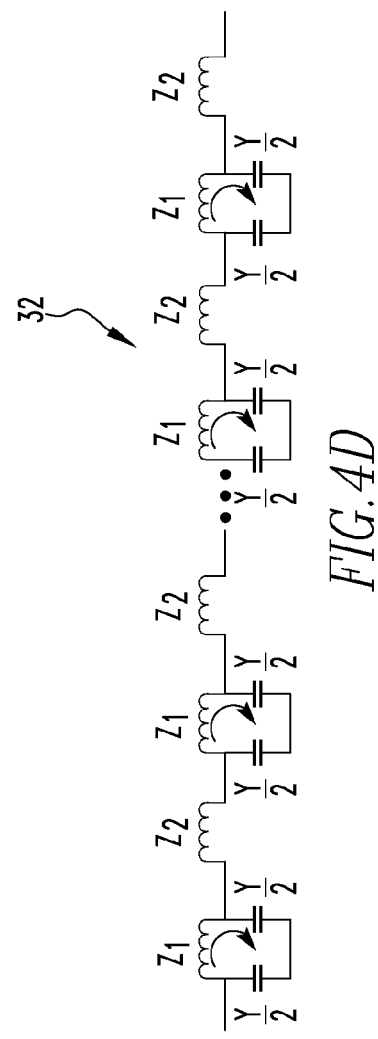
FIG. 4D is a simplified equivalent circuit model of a version of the wireless energy transfer cell shown in FIGS. 4A-4C.
Figure 4A:
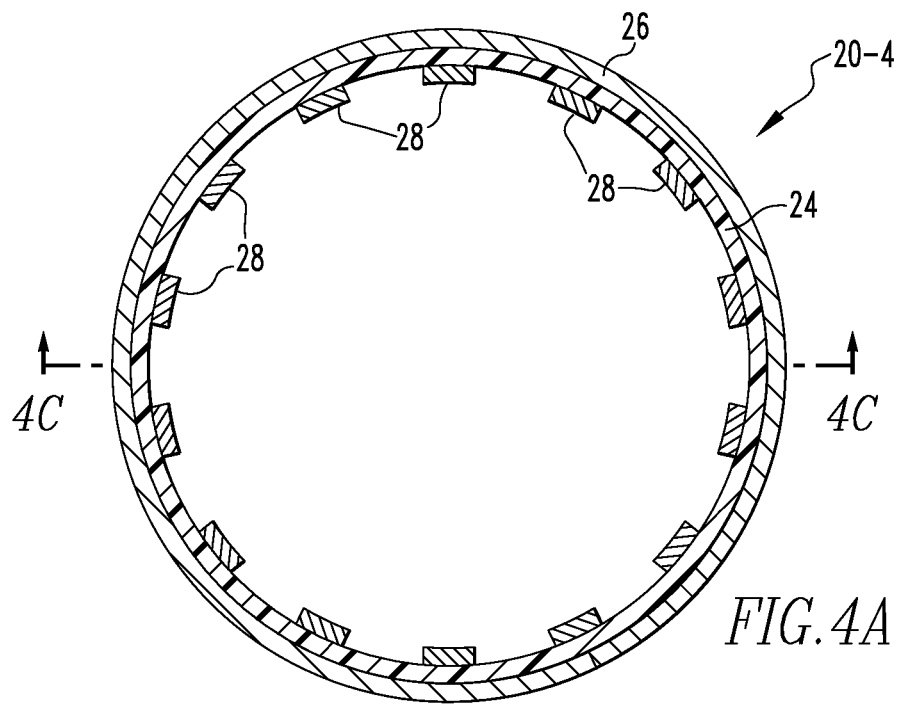
FIGS. 4A, 4B and 4C are top plan, side elevational and cross-sectional views, respectively, of another particular embodiment of a wireless energy transfer cell that may be employed in the wireless energy transfer units describe herein.
Figure 4B:
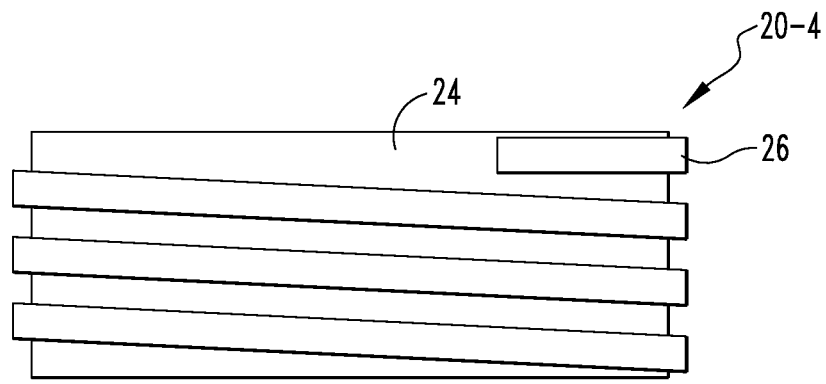
Figure 4C:
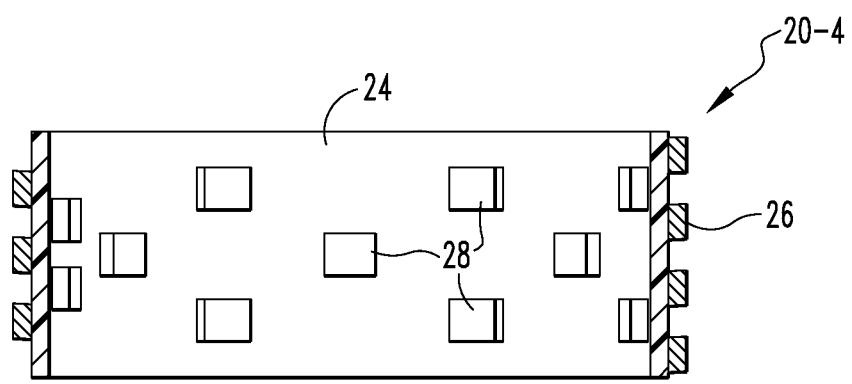

FIGS. 4A and 4B are top plan and side elevational views, respectively, of an alternative particular embodiment of a wireless energy transfer cell 20-4 that is similar to the wireless energy transfer cell 20-3. FIG. 4C is a cross-sectional view of the wireless energy transfer cell 20-4 taken along lines C-C of FIG. 4A. In the wireless energy transfer cell 20-4, the conductive strips 28 each cover only two adjacent portions of the helical conductor coil 26. Furthermore, in either the wireless energy transfer cell 20-3 or the wireless energy transfer cell 20-4, the rectangular conductive strips 28 can be replaced by conductive strips having other patterns or shapes arranged in different ways for particular applications. The design of the wireless energy transfer cell 20-4 which includes a larger number of conductive strips 28 helps to better distribute the capacitance over the interior surface while reducing the eddy current.

FIG. 4D is a simplified equivalent circuit model 32 of a version of the wireless energy transfer cell 20-4 using a Π-circuit model. The impedances and admittance of each segment in FIG. 4D are represented by the same symbols as those in FIG. 3D. Here it is also assumed that the length of a segment having part of the conductors in both layers is small enough so that the inductance of the conductor in the interior layer can be neglected. In the Π-circuit model, the impedances and the admittance are calculated using the following equations:

$$Z_1 = Z_l \frac{\sinh(l_1 \sqrt{Z_l Y_l})}{\sqrt{Z_l Y_l}} \quad (6)$$

$$\frac{Y}{2} = \frac{Y_l}{2} \frac{\tanh(l_1 \sqrt{Z_l Y_l}/2)}{\sqrt{Z_l Y_l}/2} \quad (7)$$

$$Z_2 = Z_l l_2, \quad (8)$$

It is obvious that when the circuit is resonating, the current stays in the loops indicated by the arrows. There are no currents flowing into the inductors with the impedances of $Z_2$ since they are not in a closed loop. To find the resonant frequency, we calculate the total impedance of the circuit $$Z_{total} = \frac{4N_1 Z_1}{Z_1 Y + 4} + N_2 Z_2, \quad (9)$$

where $N_1$ and $N_2$ are the total lengths of the segments with conductors in both layers and only in the exterior layer separately. By setting $Z_{total} = \infty$, the resonant condition can be found. Using the distributed parameters in (6) and (7), the simplified equation below can be found:

$$\sin h(l_1\sqrt{Z_1 Y})\tan h(l_1\sqrt{Z_1 Y}/2) = -2. \quad (10)$$

The solution of equation (10) is:

$$l_1\sqrt{Z_1 Y} = j(2k+1)\pi, k=0,1,2,\ldots \quad (11)$$

Now using the distributed inductance and capacitance instead of the impedance and admittance in (11), the resonant frequency may be found:

$$\omega = \frac{(2k+1)\pi}{l_1\sqrt{L_l C_l}}, k = 0, 1, 2, \ldots \quad (12)$$

Equation (12) indicates that there are many resonant frequencies in this design. These frequencies can be useful for many purposes. For instance, the lower frequencies can be used to transmit energy for power while the higher frequencies can be used for communication. If the loss by adding a distributed resistance per length $R_l$ of the $\Pi$-circuit (the loss in the insulator is neglected) is considered, the Q factor then becomes $$Q = \frac{\omega L_l}{R_l} = \frac{(2k+1)\pi}{l_1 R_l}\sqrt{\frac{L_l}{C_l}}, k = 0, 1, 2, \ldots \quad (13)$$

Note that one segment of the interior layer does not have an inductor but does have an equivalent resistor, so the Q factor is reduced by 2.

Figure 5A:
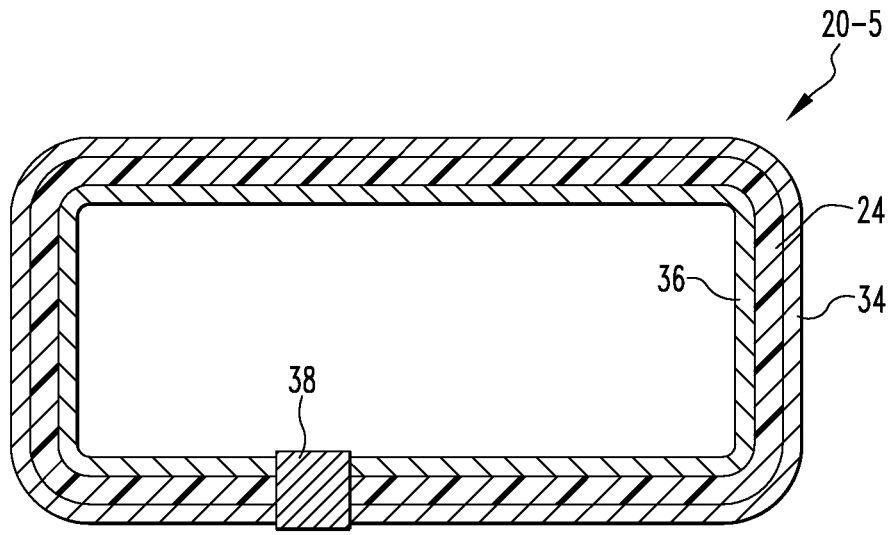
FIGS. 5A and 5B are top plan and side elevational views, respectively, of another particular embodiment of a wireless energy transfer cell that may be employed in the wireless energy transfer units describe herein.
Figure 5B:
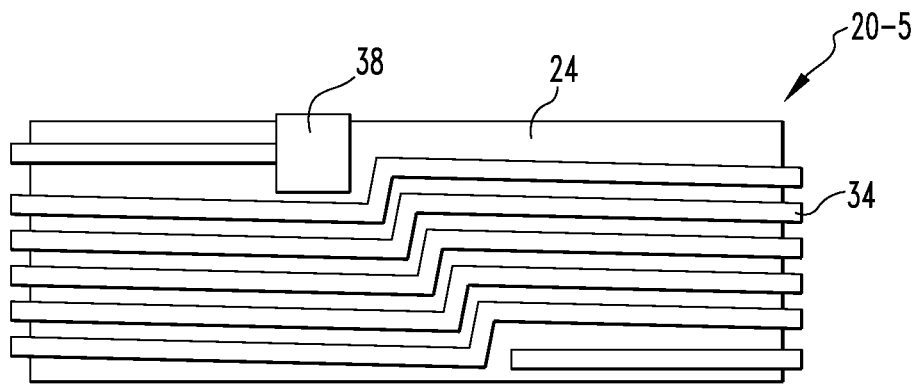

FIGS. 5A and 5B are top plan and side elevational views, respectively, of a wireless energy transfer cell 20-5 according to another particular embodiment. Like the wireless energy transfer cell 20-3 and the wireless energy transfer cell 20-4, the wireless energy transfer cell 20-5 is a thin film cell design that, in a situation where it is used to function as a receiver as described elsewhere herein, can be imbedded, or imprinted, on the exterior or interior cover (or container) of another device (e.g., the load 14). The particular design in FIGS. 5A and 5B not only utilizes the maximum dimensions of the associated (parent) device to capture the magnetic flux produced by the distally located transmitter wireless energy transfer unit 12, but also takes no interior space of the associated (parent) device. In the particular embodiment shown in FIGS. 5A and 5B, the wireless energy transfer cell 20-5 is rectangular in shape in order to correspond to an associated (parent) device that is rectangular (cross section) in shape. It is to be understood that this is meant to be exemplary only, and that the wireless energy transfer cell 20-5 may take on other shapes (e.g., circular/cylindrical) in order to correspond to associated (parent) devices of other shapes. As described below, the design of the wireless energy transfer cell 20-5 forms a compact LC tank circuit with no wire connections.

As seen in FIGS. 5A and 5B, the wireless energy transfer cell 20-5 includes three layers. The interior layer is an insulator layer 24 as described elsewhere herein. The exterior layer is a conductor coil 34 surrounding and coupled to the exterior surface of the insulator layer 24, and the interior layer is a conductor coil 36 coupled to the interior surface of the insulator layer 24. The conductor coil 34 and the conductor coil 36 are positioned such that they overlap and correspond to one another as they wind around the respective surfaces of the insulator layer 24. As a result, the capacitance produced by the conductor coil 34 and the conductor coil 36 (and the LC tank formed by the wireless energy transfer cell 20-5) is able to be increased relative to what is possible with similarly sized wireless energy transfer cells 20-3 and 20-4 due to the fact that the entire surface of the conductor coil 34 and the conductor coil 36 is used to create a capacitor. In order to perfectly align the conductor coil 34 and the conductor coil 36 on both sides of the insulator layer 24, stair-like conductor patterns are utilized as shown in FIG. 5B. In addition, as seen in FIGS. 5A and 5B, the conductor coil 34 is connected to the conductor coil 36 by a conductive patch 38. This results in the what is equivalent to a single coil having an inductance that is approximately double the inductance that would be produced by the conductor coil 34 and conductor coil 36 individually. The ability to increase the capacitance and inductance as just described is advantageous as it allows certain desired resonance frequencies to be obtained in a wireless energy transfer cell 20-5 that could not be obtained by similarly sized wireless energy transfer cells 20-3 and 20-4. Thus, a wireless energy transfer cell 20-5 may be able to be made small enough to accommodate a relatively small parent device while still achieving the particular desired resonant frequency where similarly sized wireless energy transfer cells 20-3 and 20-4 would not be able to do so.

In order to reduce the weight and increase the pliability of the wireless energy transfer cell 20-5, the conductor coil 34 and the conductor coil 36 are in one specific implementation made of copper tape or another similar suitable conductive material. Also, the conductor coil 34 and/or the conductor coil 36 may have a large surface area thereof plated with silver in order to provide for small electrical resistance adapting to the skin effect of RF current.

Figure 5C:
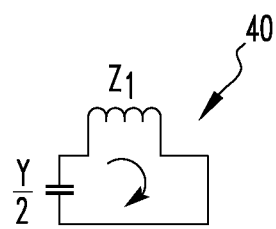
FIG. 5C is a simplified equivalent circuit model of a version of the wireless energy transfer cell shown in FIGS. 5A-5B.

FIG. 5C is an equivalent circuit 40 of the wireless energy transfer cell 20-5 using a $\Pi$-circuit. In the equivalent circuit 40, $Z_1$ and $Y/2$ are the same as those defined in Eqs. (6) and (7). The resonant condition now becomes $Z_1 Y = -2$ which leads to $$\sin h(l\sqrt{Z_1 Y})\tan h(l\sqrt{Z_1 Y}/2) = -1, \quad (14)$$

where in this design l is the length of the conductor in the exterior layer. The solution to Eq. (14) is $$l\sqrt{Z_1 Y} = j\frac{(2k+1)\pi}{2}, k = 0, 1, 2, \ldots \quad (15)$$

Using the distributed inductance and capacitance instead of the impedance and admittance in equation (15), the resonant frequency is found:

$$\omega = \frac{(2k+1)\pi}{2l\sqrt{L_l C_l}}, k = 0, 1, 2, \ldots \quad (16)$$

It is seen that the frequencies of this design are lower than those of the wireless energy transfer cell 20-3 if the distributed parameters are the same. With these resonant frequencies, resonant objects with multiple purposes can be designed. The Q factor of this design is $$Q = \frac{\omega L_l}{R_l} = \frac{(2k+1)\pi}{2lR_l}\sqrt{\frac{L_l}{C_l}}, k = 0, 1, 2, \ldots \quad (17)$$

In the wireless energy transfer cells 20-3, 20-4 and 20-5 described previously, a magnetic core can be used inside the cell to increase inductance or the Q-factor. This core can also be excited actively by a current in a certain frequency or frequencies in order to produce a bias magnetic field, a communication signal, or an excitation to the resonant system.

Figure 6:
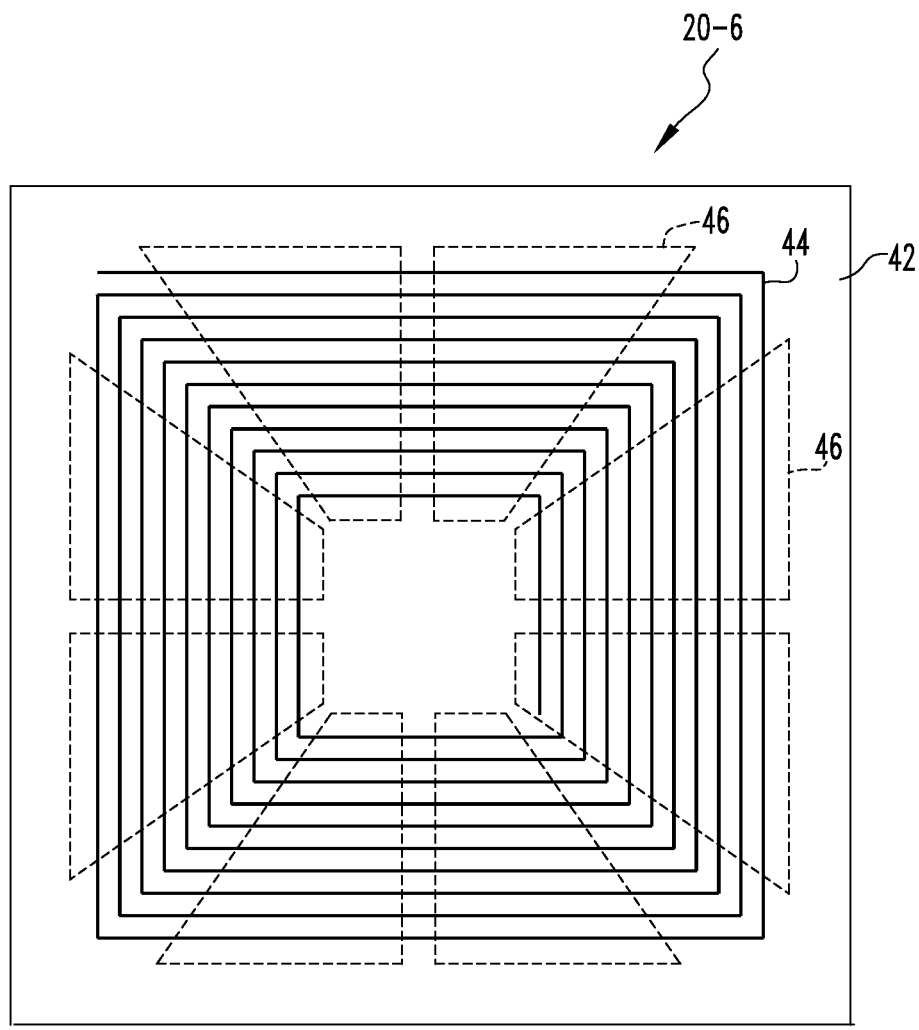
FIGS. 6, 7 and 8 are top plan views of flat, thin film wireless energy transfer cells according to further alternative embodiments.

FIG. 6 is a top plan view of a flat, thin film wireless energy transfer cell 20-6 that forms a compact LC tank circuit with no wire connections according to a further alternative embodiment. The wireless energy transfer cell 20-6 includes three layers. The middle layer is an insulator layer 42 made of, for example and without limitation, a polymer. The insulator layer 42 serves as an insulator between the conductive top and bottom layers described below. The top layer is a square spiral conductor coil 44 coupled to the top surface of the insulator layer 42. The conductor coil 44 forms an inductor which captures and generates the magnetic field (i.e., it will both receive and transmit energy from and to another energy transfer cell (resonant energy exchange)), regardless of whether it is used on the input or load side. The bottom layer includes a number of conductive strips 46 spaced around and coupled to the bottom surface of the insulator layer 42. The conductive strips 46 form physical capacitors with the overlapped parts of the conductor coil 44 and divide the inductor formed by the conductor coil 44 into segments.

Figure 7:
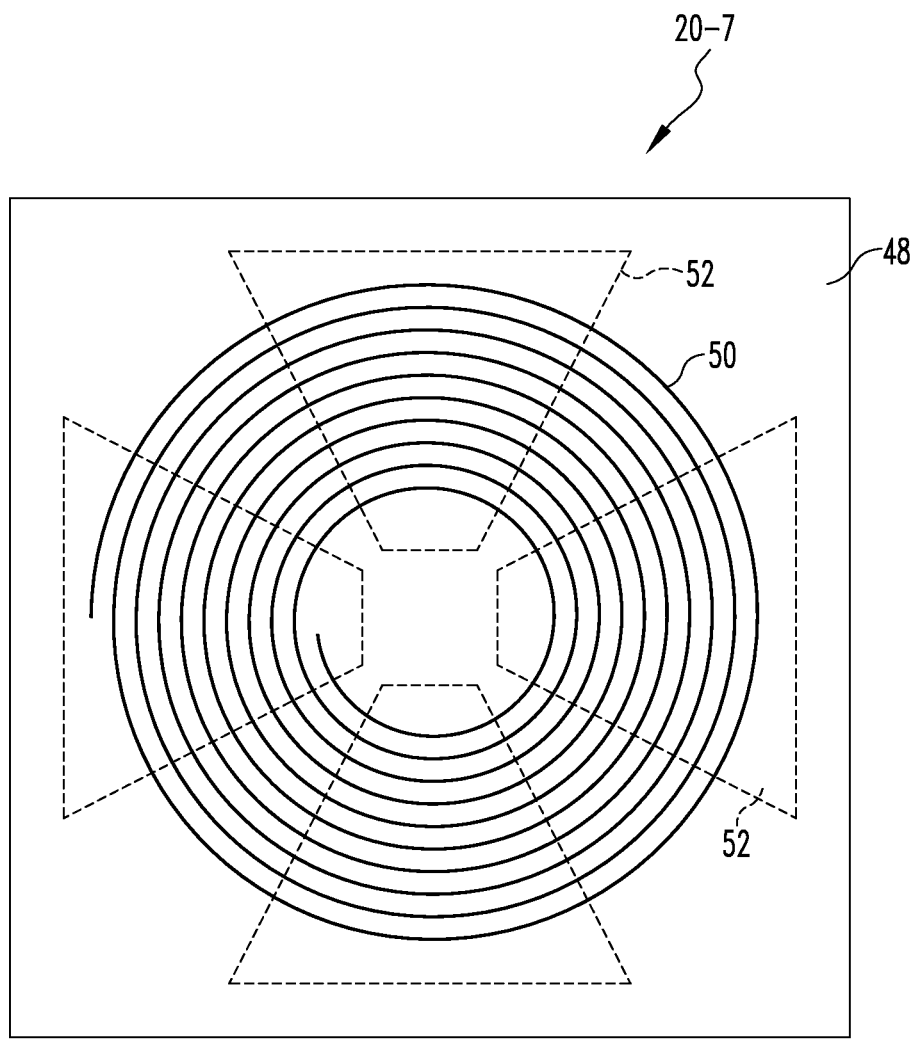

FIG. 7 is a top plan view of a flat, thin film wireless energy transfer cell 20-7 that forms a compact LC tank circuit with no wire connections according to still a further alternative embodiment. The wireless energy transfer cell 20-7 includes three layers. The middle layer is an insulator layer 48 made of, for example and without limitation, a polymer. The insulator layer 48 serves as an insulator between the conductive top and bottom layers described below. The top layer is a circular spiral conductor foil 50 coupled to the top surface of the insulator layer 48. The conductor foil 50 forms an inductor which captures and generates the magnetic field (i.e., it will both receive and transmit energy from and to another energy transfer cell (resonant energy exchange), regardless of whether it is used on the input or load side. The bottom layer includes a number of conductive strips 52 spaced around and coupled to the bottom surface of the insulator layer 48. The conductive strips 52 form physical capacitors with the overlapped parts of the conductor foil 50 and divide the inductor formed by the conductor foil 50 into segments.

Figure 8:
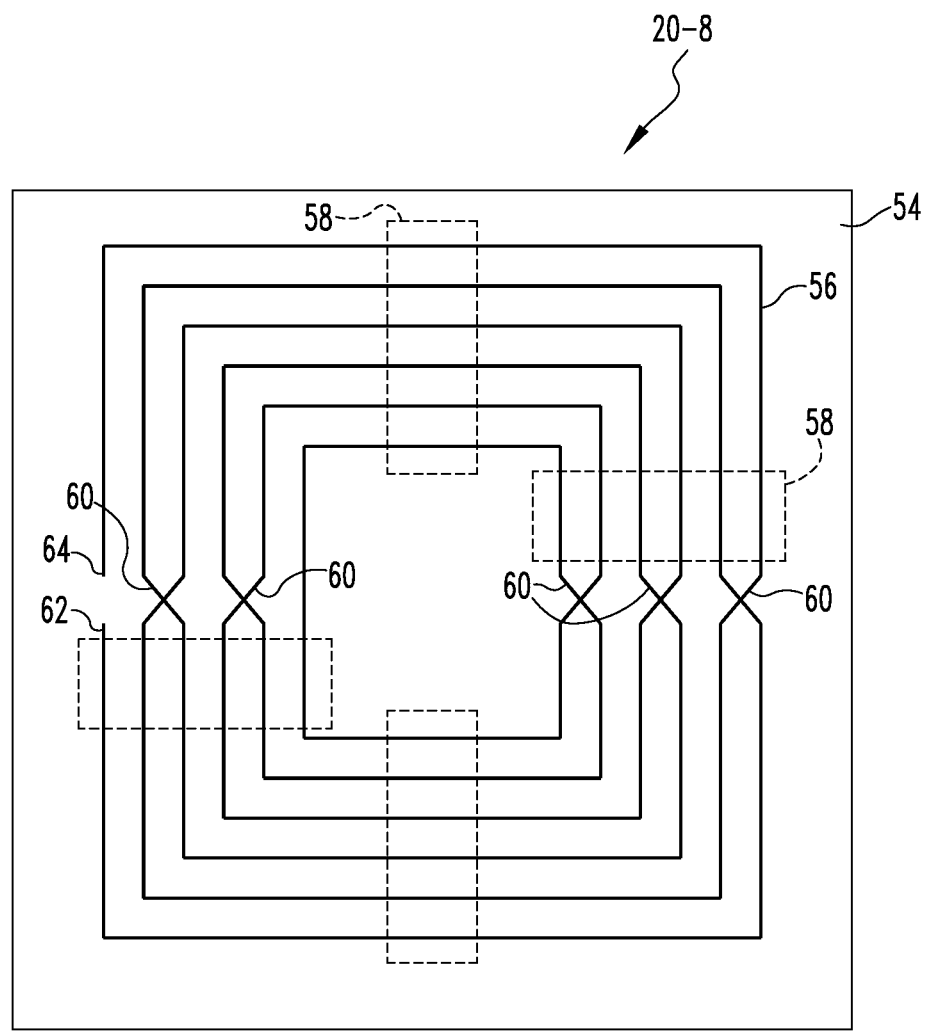

FIG. 8 is a top plan view of a flat, thin film wireless energy transfer cell 20-8 that forms a compact LC tank circuit with no wire connections according to yet a further alternative embodiment. The wireless energy transfer cell 20-8 includes three layers. The middle layer is an insulator layer 54 made of, for example and without limitation, a polymer. The insulator layer 54 serves as an insulator between the conductive top and bottom layers described below. The top layer is a square spiral conductor coil 56 coupled to the top surface of the insulator layer 54. As seen in FIG. 8, the square spiral conductor coil 56 includes crisscrossing portions 60 along the length thereof such that the beginning 62 and the end 64 of the continuous square spiral conductor foil 50 are positioned adjacent to one another. The conductor coil 56 forms an inductor which captures and generates the magnetic field (i.e., it will both receive and transmit energy from and to another energy transfer cell (resonant energy exchange)), regardless of whether it is used on the input or load side. The bottom layer includes a number of conductive strips 58 spaced around and coupled to the bottom surface of the insulator layer 54. The conductive strips 58 form physical capacitors with the overlapped parts of the conductor coil 56 and divide the inductor formed by the conductor coil 56 into segments.

Figure 9:
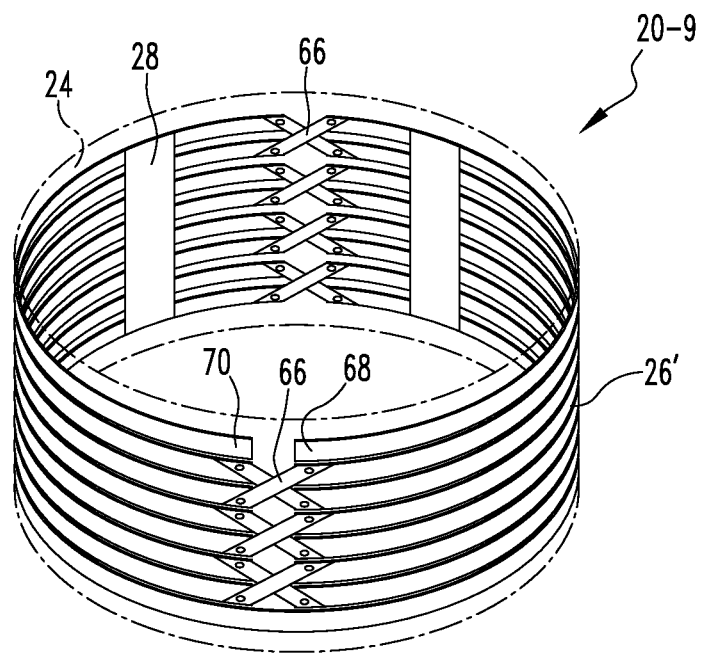
FIGS. 9 and 10 are isometric views of cylindrical wireless energy transfer cells according to still further alternative embodiments.

FIG. 9 is an isometric view of a wireless energy transfer cell 20-9 that forms a compact LC tank circuit with no wire connections according to yet a further alternative embodiment. The wireless energy transfer cell 20-9 is similar to the wireless energy transfer cell 20-3 shown in FIGS. 3A-3C, except that the wireless energy transfer cell 20-9 includes a helical conductor coil 26' that is slightly different than the helical conductor coil 26. Specifically, the helical conductor coil 26' includes crisscrossing portions 66 along the length thereof such that the beginning 68 and the end 70 of the continuous helical conductor coil 26' are positioned adjacent to one another.

Figure 10:
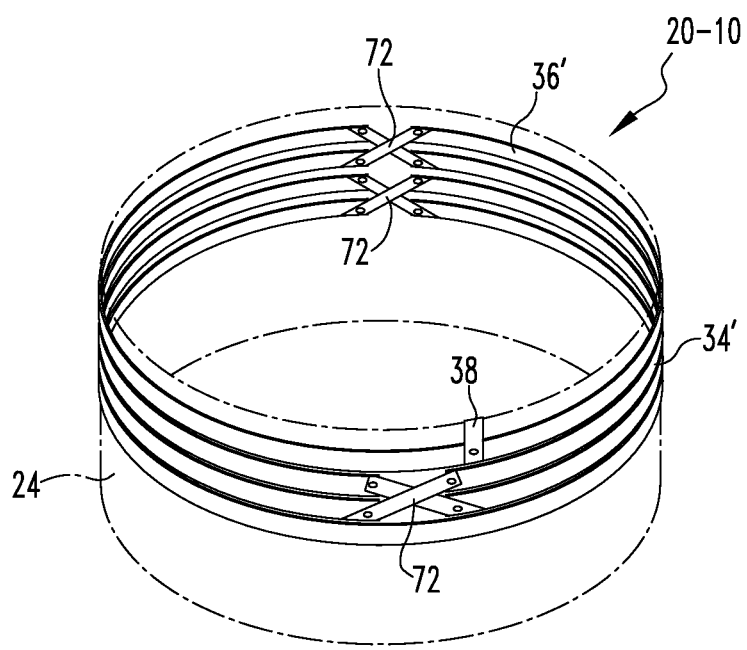

FIG. 10 is an isometric view of a wireless energy transfer cell 20-10 that forms a compact LC tank circuit with no wire connections according to yet a further alternative embodiment. The wireless energy transfer cell 20-10 is similar to the wireless energy transfer cell 20-5 shown in FIGS. 5A and 5B, except that the wireless energy transfer cell 20-10 is circular/cylindrical (although it could also be rectangular or another suitable shape) and includes helical conductor coils 34' and 36' that are slightly different than the conductor coils 34 and 36 of FIGS. 5A and 5B. Specifically, the helical conductor coils 34' and 36' each include crisscrossing portions 72 along the length thereof such that the beginning and the end of the continuous helical conductor coils 34' and 36' are positioned adjacent to one another (and possibly connected to one another).

In order to reduce the weight and increase the pliability of the wireless energy transfer cells 20-6, 20-7, 20-8, 20-9 and 20-10, the conductor coils and/or conductive strips thereof may be made of copper tape or another similar suitable material. Also, the conductor coils and/or conductive strips may have a large surface area thereof plated with silver in order to provide for small electrical resistance adapting to the skin effect of RF current.

Figure 11A:
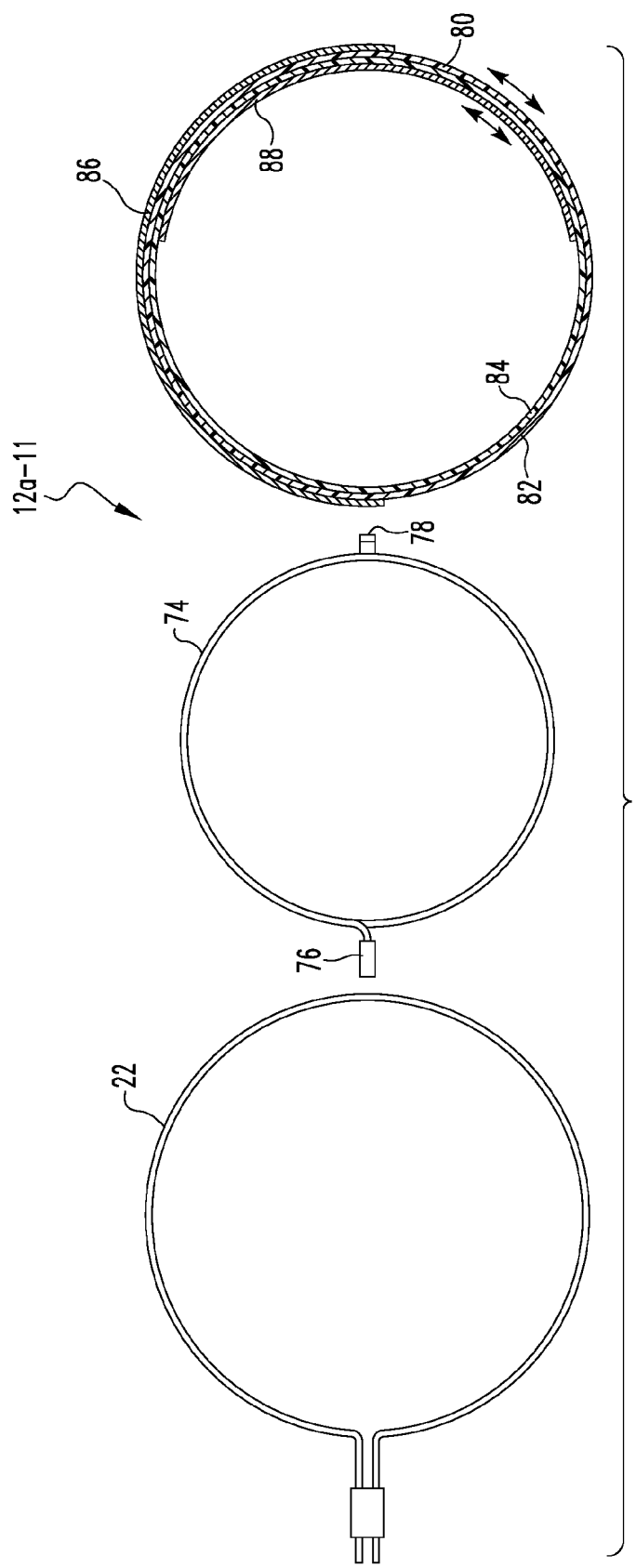
FIG. 11A is an exploded view and FIG. 11B is a top plan view of a particular embodiment of the transmitter wireless energy transfer unit shown in FIG. 1 in which the capacitance of the LC resonant tank, and therefore the resonant frequency, may be selectively adjusted.
Figure 11B:
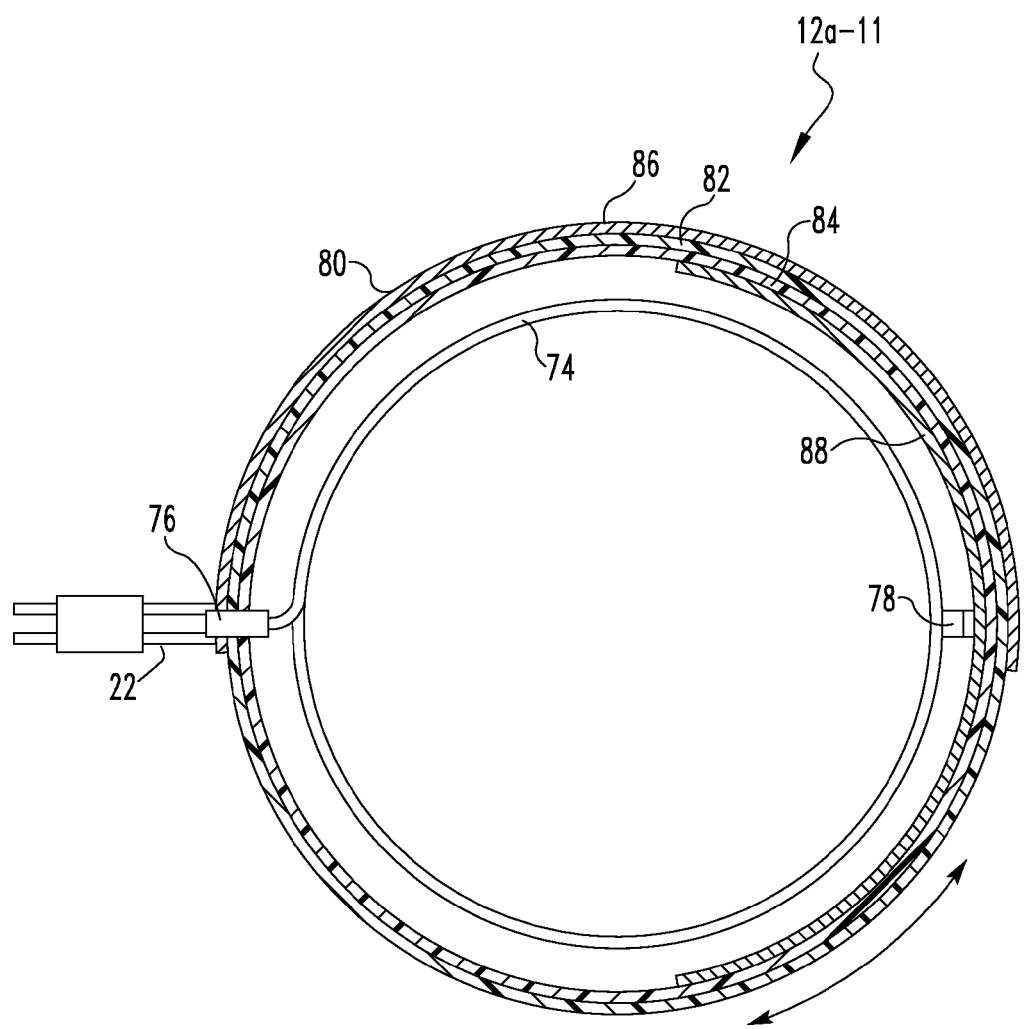

FIG. 11A is an exploded view and FIG. 11B is a top plan view of a particular embodiment of the transmitter wireless energy transfer unit 12a shown in FIG. 1, identified in FIGS. 11A and 11B as wireless energy transfer unit 12a-11 (it should be noted, however, that the wireless energy transfer unit 12a-11 may also be used as a receiver). As described in greater detail below, the wireless energy transfer unit 12a-11 is structured such that the resonant frequency of the wireless energy transfer cell 20 formed therein is selectively adjustable by selectively adjusting the capacitance thereof. The wireless energy transfer unit 12a-11 includes an energy coupling/extraction coil 22 in the form of a single loop conductor which transmits energy to the wireless energy transfer cell 20 by magnetic coupling as described elsewhere herein. The wireless energy transfer cell 20 in this particular embodiment includes a helical coil 74 having a first end 76 and a second end 78 and an adjustable capacitor 80. The helical coil 74 is, in one specific, non-limiting embodiment, made of a copper pipe coated with epoxy for insulation. The adjustable capacitor 80 includes concentric insulator rings 82 (outer) and 84 (inner), made of a polymer or some other suitable electrical insulating material, that are able to rotate and shift relative to one another as indicated by the arrows in FIG. 11A. A first conductor sheet 86, made of, for example, copper foil or another suitable conducting material, is coupled to the exterior surface of the concentric insulator ring 82 and covers approximately 50% thereof. A second conductor sheet 88, made of, for example, copper foil or another suitable conducting material, is coupled to the interior surface of the concentric insulator ring 84 and covers approximately 50% thereof When assembled, as seen in FIG. 11B, the adjustable capacitor 80 is placed on top of the energy coupling/extraction coil 22, preferably with an insulator, such as a sheet of insulating material, separating the two. In addition, the helical coil 74 is positioned inside the adjustable capacitor 80 and the first end 76 makes direct (and preferably slideable) contact with the conductor sheet 86 and the second end 78 makes direct (and preferably slideable) contact with the conductor sheet 88. This significantly reduces the resistance within the LC resonant tank circuit and eliminates the need for wire connections between the helical coil 74 and the adjustable capacitor 80. When the concentric insulator rings 82, 84 shift relative to each other, the capacitance varies over a magnitude of approximately four times for one particular embodiment of the adjustable capacitor 80, but could vary by other orders of magnitude depending on particular dimensions of the adjustable capacitor 80, providing adjustability of resonant frequency of the wireless energy transfer unit 12*a*-11.

Figure 12:
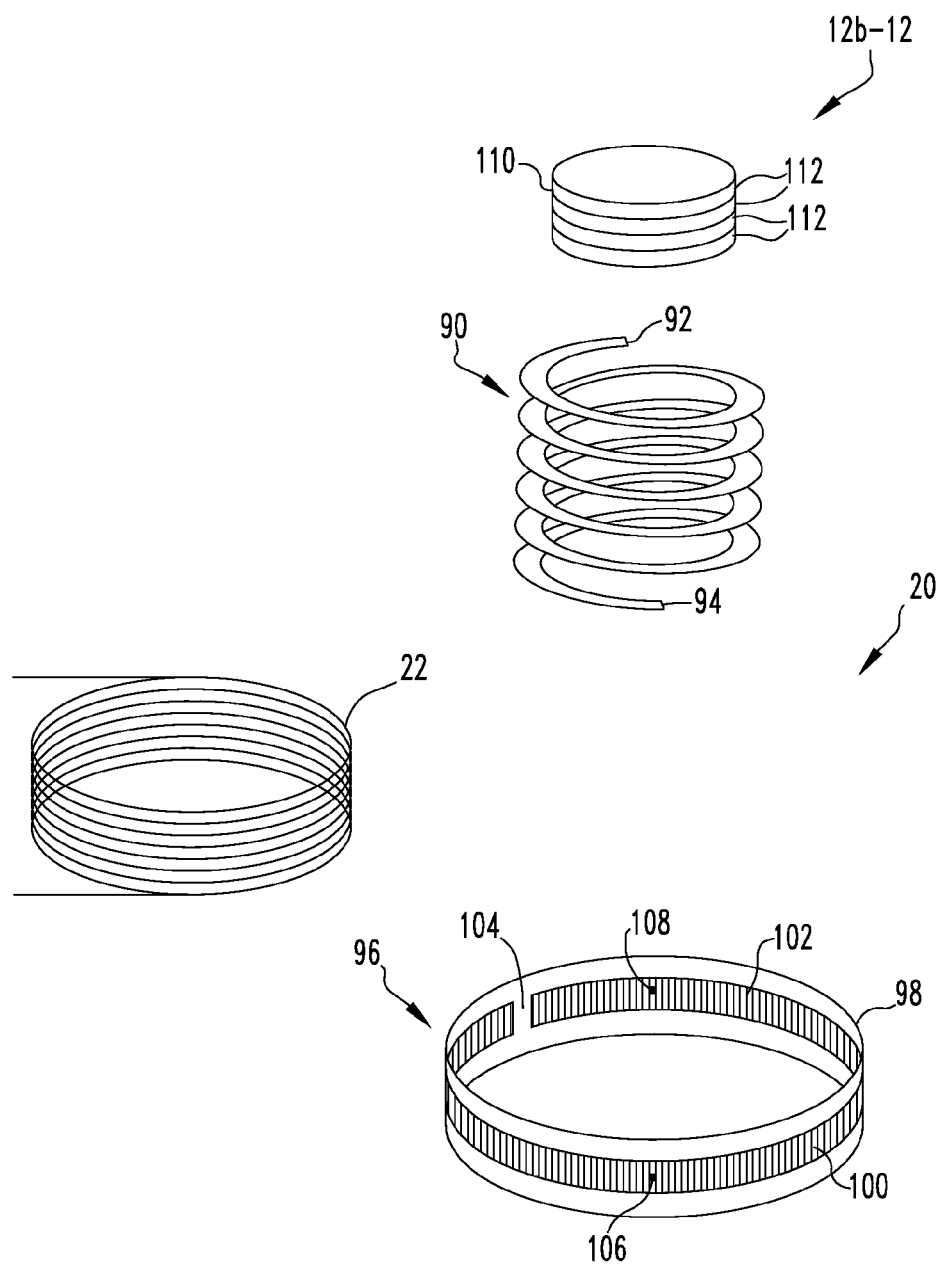
FIG. 12 is an exploded view of a particular embodiment of the receiver wireless energy transfer unit shown in FIG. 1 in which the inductance of the LC resonant tank, and therefore the resonant frequency, may be selectively adjusted.

FIG. 12 is an exploded view of a particular embodiment of the receiver wireless energy transfer unit 12*b* shown in FIG. 1, identified in FIG. 12 as wireless energy transfer unit 12*b*-12 (it should be noted, however, that the wireless energy transfer unit 12*b*-12 may also be used as a transmitter). As described in greater detail below, the wireless energy transfer unit 12*b*-12 is structured such that the resonant frequency of the wireless energy transfer cell 20 formed therein is selectively adjustable by selectively adjusting the inductance thereof. The wireless energy transfer unit 12*b*-12 includes an energy coupling/extraction coil 22 in the form of a helical conductor coil which extracts energy from the wireless energy transfer cell 20 though magnetic coupling as described elsewhere herein so that the energy can be provided to a load such as the load 14. The wireless energy transfer cell 20 in this particular embodiment includes a helical coil 90 having a first end 92 and a second end 94 and ring capacitor 96. The helical coil 90 is, in one specific, non-limiting embodiment, made of solid silver wire in order to reduce resistance within the LC tank. The ring capacitor 96 includes a cylindrical insulator ring 98 made of a polymer or some other suitable electrical insulating material. A first conductor ring 100, made of, for example, silver sheet material (to reduce resistance within the LC tank) or another suitable conducting material, is coupled to the exterior surface of the insulator ring 98 and a second conductor ring 102 made of, for example, silver sheet material (to reduce resistance within the LC tank) or another suitable conducting material, is coupled to the interior surface of the insulator ring 96. A gap 104 is intentionally formed within both the first conductor ring 100 and the second conductor ring 102 in order to break the potentially harmful loop current. When assembled, the helical coil 90 is positioned inside the ring capacitor 96 and the first end 92 makes direct contact with the conductor ring 100 at point 106 and the second end 94 makes direct contact with the conductor ring 102 at point 108. This significantly reduces the resistance within the LC resonant tank circuit and eliminates the need for wire connections between the helical coil 90 and the ring capacitor 96.

Since the ring capacitor 96 in this embodiment is not adjustable, it has a fixed capacitance. Instead, the resonant frequency of the wireless energy transfer unit 12*b*-12 is adjusted by changing the inductance value of the helical coil 90. This is achieved by placing a ferromagnetic core 110 comprising a plurality of ferromagnetic discs 112 at the center of the wireless energy transfer unit 12*b*-12 within the helical coil 90. In particular, the ferromagnetic core 110 is formed by stacking multiple ferromagnetic discs 112 which can be selectively added or removed. As a result, the inductance value may be adjusted in a plurality of steps based on the number of ferromagnetic discs 112 that are stacked.

As will be appreciated, in a system such as the wireless energy transfer system 2, the wireless energy transfer unit 12*a* will be larger (sometimes much larger) than the wireless energy transfer unit 12*b*. However, as noted elsewhere herein, for the wireless energy transfer system 2 to work, the resonant frequency or frequencies of the wireless energy transfer unit 12*a* (transmitter) and the wireless energy transfer unit 12*b* (receiver) must be the same. The embodiment of the receiver wireless energy transfer unit 12*b*-12 includes a number of attributes that allow the LC product in the LC tank to be increased so that the resonant frequency can be matched to the resonant frequency of a larger transmitter wireless energy transfer unit 12*a*. First, almost the entire circumference of the ring capacitor 96 is utilized to maximize capacitance. Also, the adjustable ferromagnetic core 110 allows the inductance of the helical coil 90 to be increased as needed.

Figure 13:
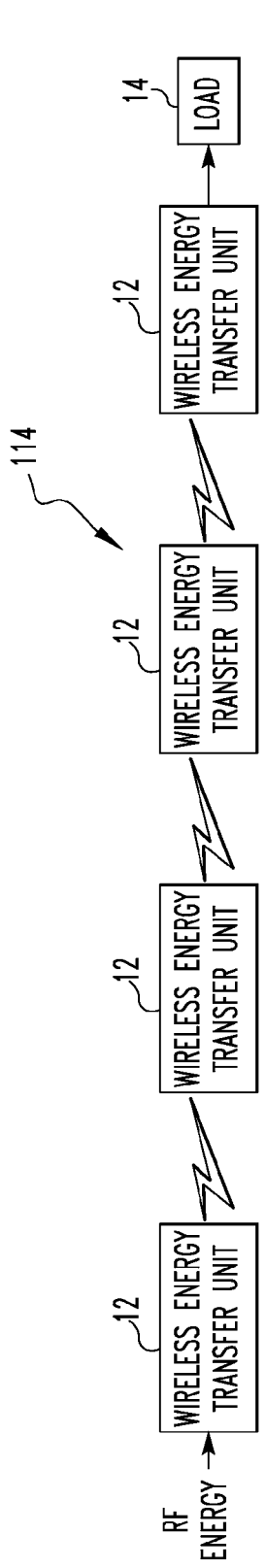
FIGS. 13 and 14 are block diagrams of wireless energy transfer relay systems according to alternative embodiments of the present invention.
Figure 14:
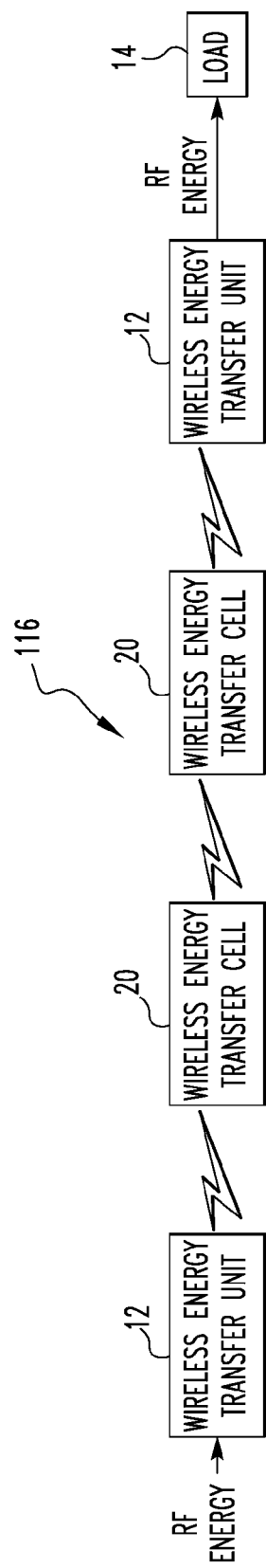

The present inventors have found that multiple wireless energy transfer units 12 can be linked to form a relay system with much higher average energy transfer efficiency than that of the system activated individually. A block diagram of such a relay system 114 is shown in FIG. 13. By placing a single or a number of relay wireless energy transfer units 12 between the transmitter wireless energy transfer unit 12 (leftmost in FIG. 13) and the receiver wireless energy transfer unit 12 (rightmost in FIG. 13 and coupled to the load 14), the distance of transfer can be extended significantly. A block diagram of an alternative relay system 116 is shown in FIG. 14. In the alternative relay system 116, the relay units are wireless energy transfer cells 20 rather than wireless energy transfer units 12. As a further alternative, the relay units can be a combination of wireless energy transfer units 12 and wireless energy transfer cells 20. In addition, the relay units need not be positioned in a linear fashion with respect to one another and the transmitter and/or receiver units, but instead the present inventors have found that one or more may be offset such that the path from the transmitter wireless energy transfer unit 12 to the receiver wireless energy transfer unit 12 is not linear (in fact, it may have portions that are perpendicular to one another). Furthermore, the relay units need not be arranged in a straight or curved path, a number of relay units can form a two-dimensional or three-dimensional array with equal or unequal distances between units. This array embodiment allows energy and/or data to be routed in desirable paths within the array between arbitrary energy transmitter (source) and receiver (sink) units. Besides passing energy as relays, when necessary, relay units can also consume energy in order to perform certain functions, such as acting as an infrequently activated sensor.

Figure 15A:
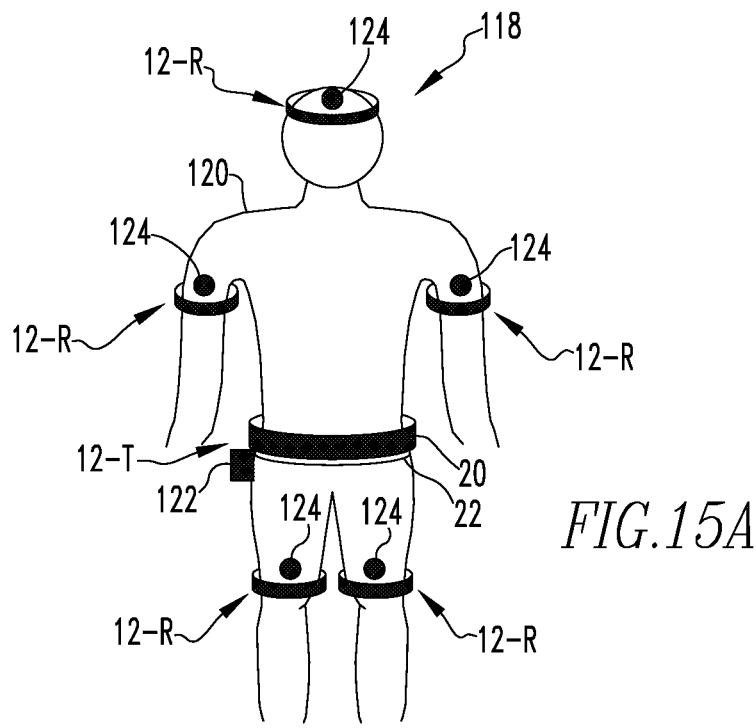
FIGS. 15A and 15B are a block diagrams of wireless energy transfer sensor networks according to two different embodiments of the present invention.

This relay technique is valuable in the design of a sensor network because, when all the receiver nodes in the network resonate at the same frequency, the interactions among all member nodes of the network increase the average energy transfer efficiency. One such sensor network 118 for use in connection with a human subject is shown in FIG. 15A. The sensor network 118 includes a transmitter wireless energy transfer unit 12-T worn around the waist of the subject 120 like a belt. An RF power supply 122 is coupled to the energy coupling/extraction coil 22 of the transmitter wireless energy transfer unit 12-T. The sensor network 118 also includes a number of receiver wireless energy transfer units 12-R worn around various parts of the body of the subject 120, such as the arms, legs and head. Each receiver wireless energy transfer unit 12-R has a sensor 124 coupled to the energy coupling/extraction coil 22 thereof, powered by the transferred RF energy as described elsewhere herein, for sensing or detecting various parameters/characteristics/signals relating to the subject. The sensors 124 may be attached externally to the body of the subject 120 and/or implanted within the body of the subject 120, and can include, without limitation, a blood pressure sensor, an accelerometer, a temperature sensor, an ECG sensor, a microphone and an $SpO_2$ sensor. As described elsewhere herein, data may also be communicated between the transmitter wireless energy transfer unit 12-T and the various receiver wireless energy transfer units 12-R using the wireless energy transfer techniques of the present invention.

Figure 15B:
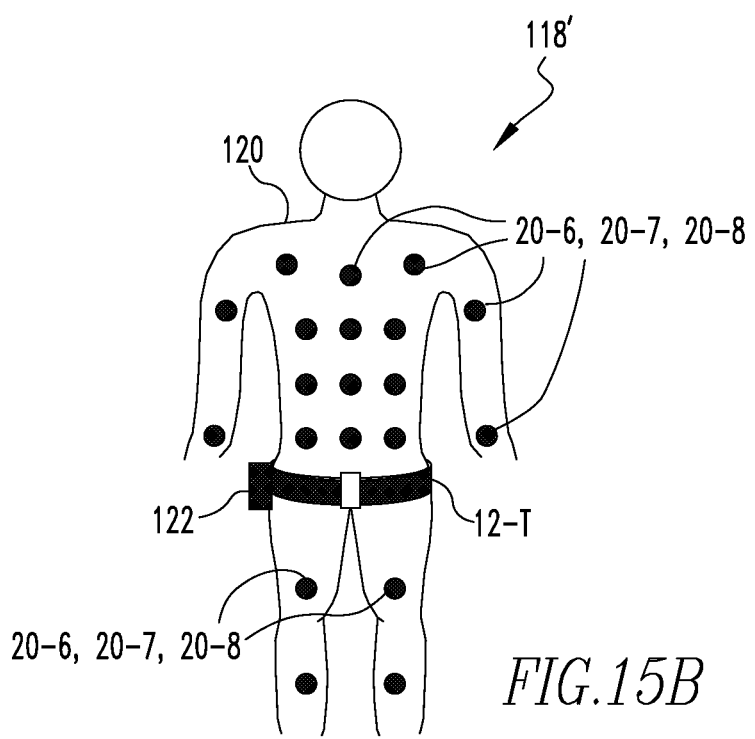

In another embodiment shown in FIG. 15B, the sensor network 118' includes a transmitter wireless energy transfer unit 12-T worn around the waist of the subject 120 like a belt. An RF power supply within unit 122 is coupled to the energy coupling/extraction coil of the transmitter wireless energy transfer unit 12-T. The sensor network 118' also includes sensor nodes which include receiver wireless energy transfer cells 20 in the form of wireless energy transfer cells 20-6, 20-7, and/or 20-8. These flat cells, integrated with or coupled to micro sensors and energy coupling/extraction coils, can be pasted on the underside of clothes, or affixed directly on the skin, to acquire physiological or physical variables, such as multichannel electrocardiograms for 24-hour heart monitoring or motion/position signals for body balance and physical activity monitoring. Noninvasive or implantable devices embedded or imprinted with energy transfer cells (in a suitable form selected from 20-3 through 20-8) within or on the cover of the parent device can also be used as the sensor nodes of the body sensor network 118'. Both the energy and data within the body sensor network 118' are centrally provided/collected by wireless energy transfer unit 12-T and RF power supply within unit 122. The collected data can be stored within unit 122 or transmitted wirelessly to a computer located closely or remotely, with a possible connection to the Internet.

In another embodiment, the transmitter wireless energy transfer unit 12-T is positioned in a stationary location, such as a headboard of a bed or on a night stand, so that the sensors 124 can be powered and make measurements while the subject 120 is sleeping.

As noted in a number of places elsewhere herein, the techniques of the present invention may also be used for wireless data transfer. Although wireless data transfer can be a significant problem in a wide variety of practical applications such as microsensors and implantable devices, its implementation is relatively easy once the wireless power transfer as described herein using a system such as the wireless energy transfer system 2, the relay system 114 or 116, or the sensor network 118 is established. There are several methods to implement a communication channel taking advantage of an energy transfer channel as described herein. For example, data can be sent by amplitude modulation (AM) of the energy transfer waveforms. They can also be sent by switching on or off a constant amplitude energy transfer waveform signal (amplitude-shift keying, or ASK). In addition, as previously described, certain of the wireless energy transfer cells 20 (e.g., thin-film designs 20-3, 20-4, 20-5) have multiple resonant frequencies and thus may be used to implement multiple communication channels. Specifically, while one of these frequencies is used to transfer power, other frequencies can be used as communication channels, providing users with flexible design options.

Figure 16:
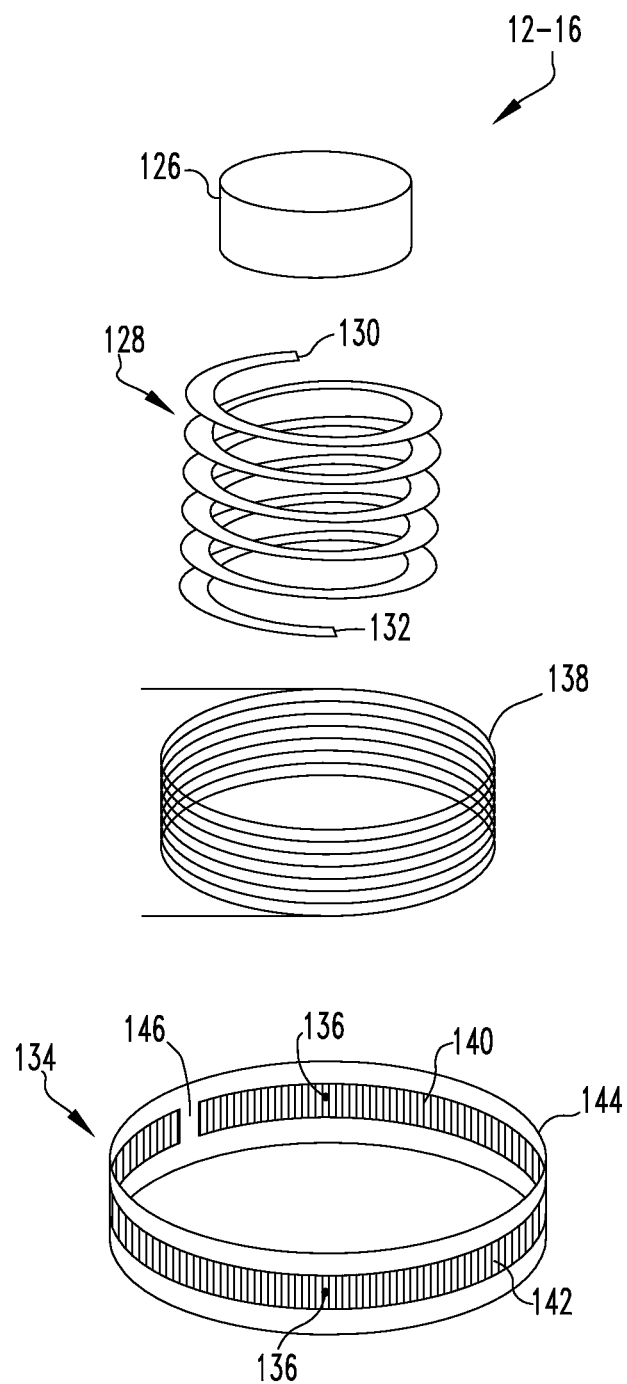
FIG. 16 is an exploded view of a wireless energy transfer unit having a vertical cell design according to an alternative embodiment of the present invention.

FIG. 16 is an exploded view of wireless energy transfer unit 12-16 having a vertical cell design according to an alternative embodiment. The wireless energy transfer unit 12-16 includes six cylindrical components stacked in a concentric fashion forming a "pie" with vertical layers. The inner-most layer is an RF ferrite core 126. The next layer is a coil 128 preferably made of a strip of highly conductive (e.g., silver) sheet wound in the spring-like form shown. The coil 128 has a first end 130 and a second end 132. Preferably, the coil 128 is coated with a thin polymer film and compressed to form a low-height cylindrical coil. This space-saving coil 128 is coupled with a ring capacitor 134, described below, at connection points 136. Specifically, the end 130 is directly coupled to one connection point 136 and the end 132 is coupled to the other connection point 136. A coil 138 comprises the energy coupling/extraction coil 22 of the wireless energy transfer unit 12-16. The coil 138 is preferably wound with thin, highly conductive (e.g., copper) wire and glued into the shape of a cylindrical shell. The coil 138 is magnetically coupled with the coil 128 to receive an appropriate amount of energy and output an AC current to a load such as the power supply circuit of the parent device. The ring capacitor 134 includes inner and outer conductive (e.g., metal) rings 140, 142, respectively, preferably made of copper or gold films (or sheets) coupled on both sides of a thin insulator (preferably polymer) sheet 144. In order to prevent an undesirable loop current within conductive rings 140, 142, a gap 146 is made in each one to break this current. In this embodiment, the components other than the coil 138 form the wireless energy transfer cell 20 of the wireless energy transfer unit 12-16. For ease of illustration, certain components, e.g., insulating sheets between components such as between the coil 138 and the coil 128 and the ring capacitor 134 to provide electrical isolation therebetween, are not shown in the Figure.

Figure 17:
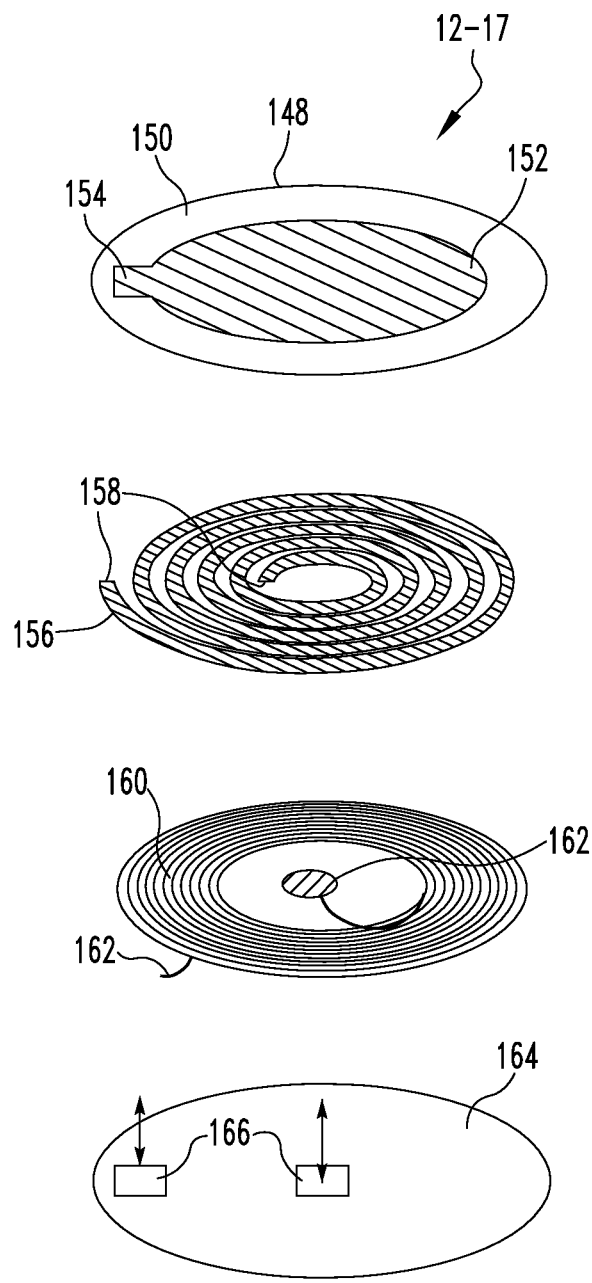
FIG. 17 is an exploded view of a wireless energy transfer unit having a horizontal cell design according to a further alternative embodiment of the present invention.

FIG. 17 is an exploded view of wireless energy transfer unit 12-17 having a horizontal cell design according to a further alternative embodiment. The wireless energy transfer unit 12-17 is designed in a sandwich structure. The wireless energy transfer unit 12-17 includes a capacitor 148 formed by an insulator film 150, such as, without limitation, a low-loss polymer or inorganic film, with conductive (e.g., gold) films 152 attached to both sides (only one side is shown in FIG. 17). Each conductive film 152 includes a connection tab 154. The wireless energy transfer unit 12-17 also includes a planar coil 156 having ends 158 on an insulating substrate (not shown). The two ends 158 of the coil are directly connected to respective tabs 154 of the metal films 152, where one connection is at the center and the other is near the side. A coil 160 is also provided and comprises the energy coupling/extraction coil 22 of the wireless energy transfer unit 12-17. The coil 160 is structurally similar to the coil 156 but preferably has more turns. The coil 160 is magnetically coupled with the coil 156. The two ends 162 of the coil 160 are energy input/output terminals. Finally, the wireless energy transfer unit 12-17 includes a polymer protection cover 164 with two connection terminals 166 for coupling to the ends 162 (see double arrows shown in FIG. 17). Again, one terminal 166 is located at the center and the other at the side. Preferably, the operating frequency of the wireless energy transfer unit 12-17 is intended to be between 10-30 MHz, although it can be lower or higher. In this embodiment, the components other than the coil 160 form the wireless energy transfer cell 20 of the wireless energy transfer unit 12-17. For ease of illustration, certain components, e.g., additional insulating sheets between components and additional protection covers, are not shown in the Figure.

Figure 18:
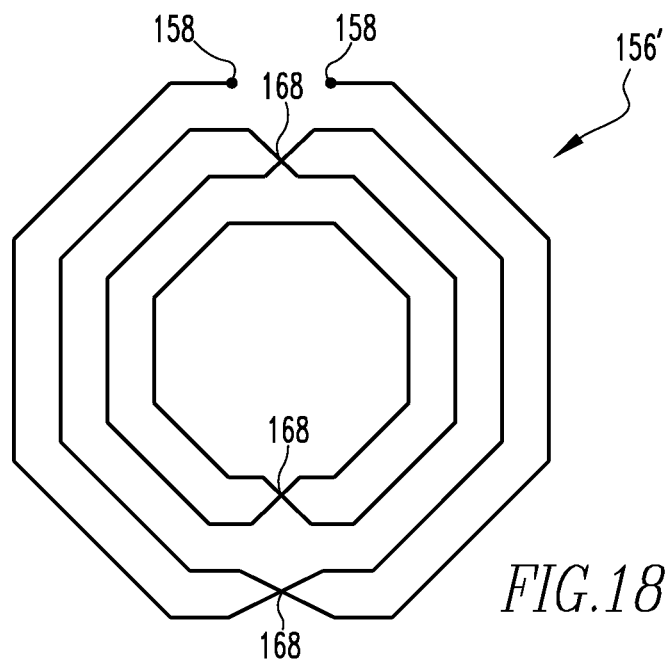
FIG. 18 is a top plan view of an alternative coil that may be used in the wireless energy transfer unit of FIG. 17.

It has been shown that the performance of the planar spiral coil 158 can be improved considerably by using advanced thin-film technology. For example, as shown in FIG. 18, an alternative coil 156' may be formed by making cross-connections 168 in the coil 156', which results in a symmetric structure with ends 158 positioned adjacent to one another. This structure reduces the capacitive coupling within the coil 156' and improves quality factors. It has also been shown that this design can be extended to three dimensions with significantly better performance. Such designs are shown in FIGS. 9 and 10.

In the various embodiments described herein (e.g., without limitation, FIGS. 3A-3C, 4A-4C, 5A-5B, 6-12 and 16-17), energy transfer (for power and/or data transfer) is provided by the magnetic field in the free space. In contrast, the electric field is confined within the physical capacitors (including the insulators) provided as part of the wireless energy transfer cells. This feature effectively prevents the leakage of the electrical field and helps reduce health concerns since the human body (and other electrically conductive objects) interacts much more strongly with electric fields than with magnetic fields. The designs described herein also improve efficiency because the power absorption by electrically conductive objects is reduced. Further, in many of the designs, the wireless energy transfer cells can be made to be thin, soft, flexible and light.

Figure 19:
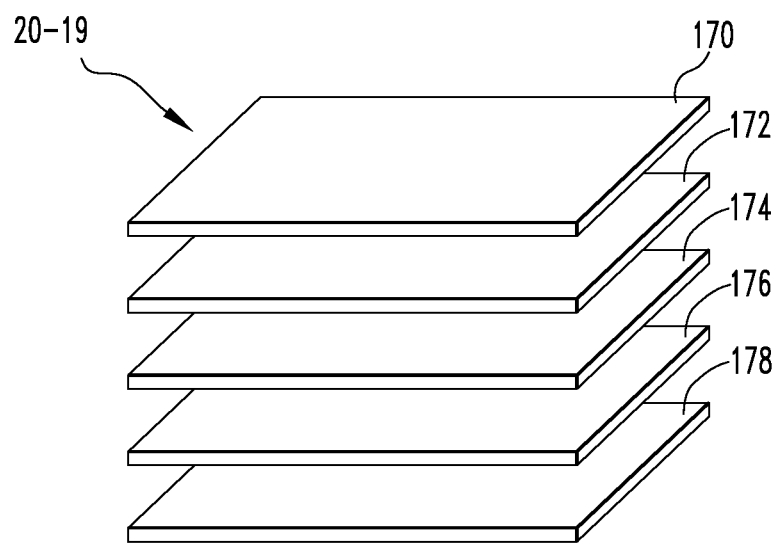
FIG. 19 is an isometric view of a non-coil wireless energy transfer cell according to still a further alternative embodiment.

FIG. 19 is an isometric view of a non-coil wireless energy transfer cell 20-19 according to still a further alternative embodiment. The wireless energy transfer cell 20-19 comprises a laminated sheet that includes five layers. Specifically, the wireless energy transfer cell 20-19 includes a top layer 170 and a bottom layer 178 each made of a magneto-electric material that produces an electric field when exposed to a magnetic field. An example of a suitable, preferred magnetoelectric material, known as Metglas®, is described in J. Zhai, Z. Xing, S. Dong, J. Li and D. Viehland, "Magnetoelectric Laminate Composites: An Overview," J. Am. Ceram. Soc., 91(2):351-358, 2008. The wireless energy transfer cell 20-19 also includes conductor layers 172 and 176 positioned adjacent to the top layer 170 and the bottom layer 178, respectively. Each conductor layers 172 and 176 is made of a conducting material, such as a suitable metallic material, and forms an electrode. A central layer 174 is located in between the conductor layers 172 and 176. The central layer 174 is made of a piezoelectric material. In operation, when a magnetic field is applied to the top layer 170 and the bottom layer 178 as a result of the magnetic coupling with the energy coupling/extraction coil as described herein, an electric field is produced and applied to the conductor layers 172 and 176. The conductor layers 172 and 176 then apply the electric field to the central layer 174, causing it to resonate. The wireless energy transfer cell 20-19 may be preferred in certain applications since the various coil-capacitor structures described elsewhere herein have a number of forms of energy loss due to electromagnetic radiation and electrical resistance within the associated conductor, whereas the conversion between the magnetic and electric fields in the wireless energy transfer cell 20-19 tends to be more efficient (in some cases up to 100 times more efficient).

Figure 20:
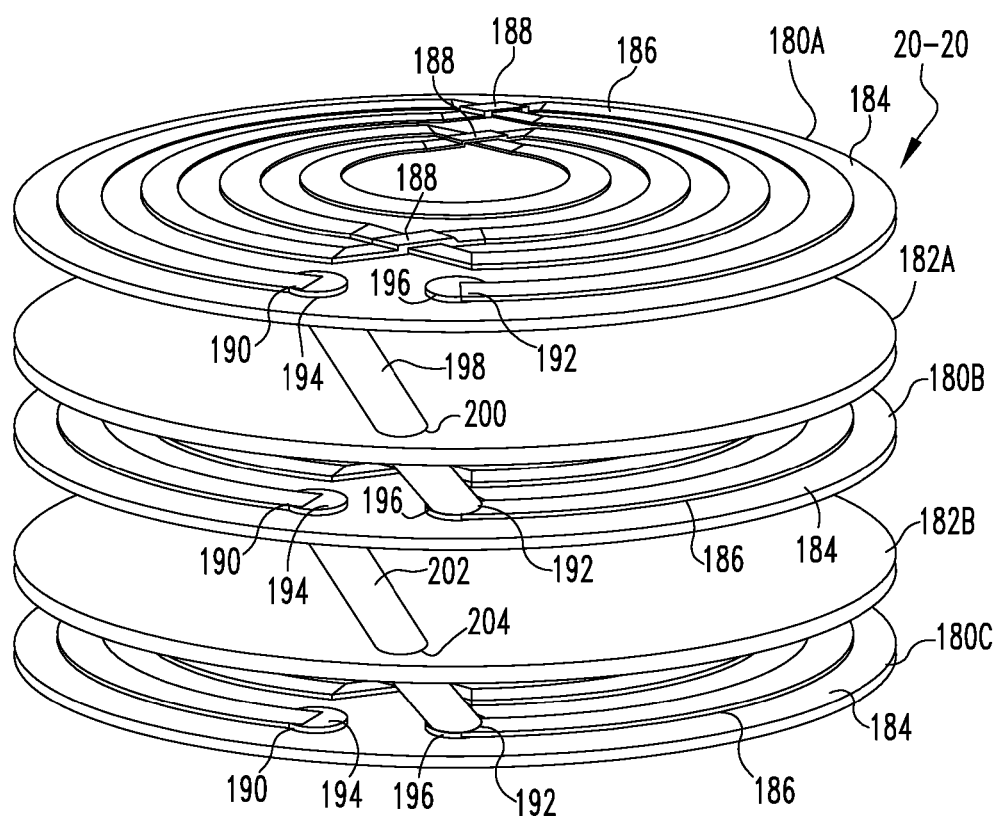
FIG. 20 is an exploded isometric view of a multi-layer wireless energy transfer cell according to still another alternative embodiment.
Figure 21:
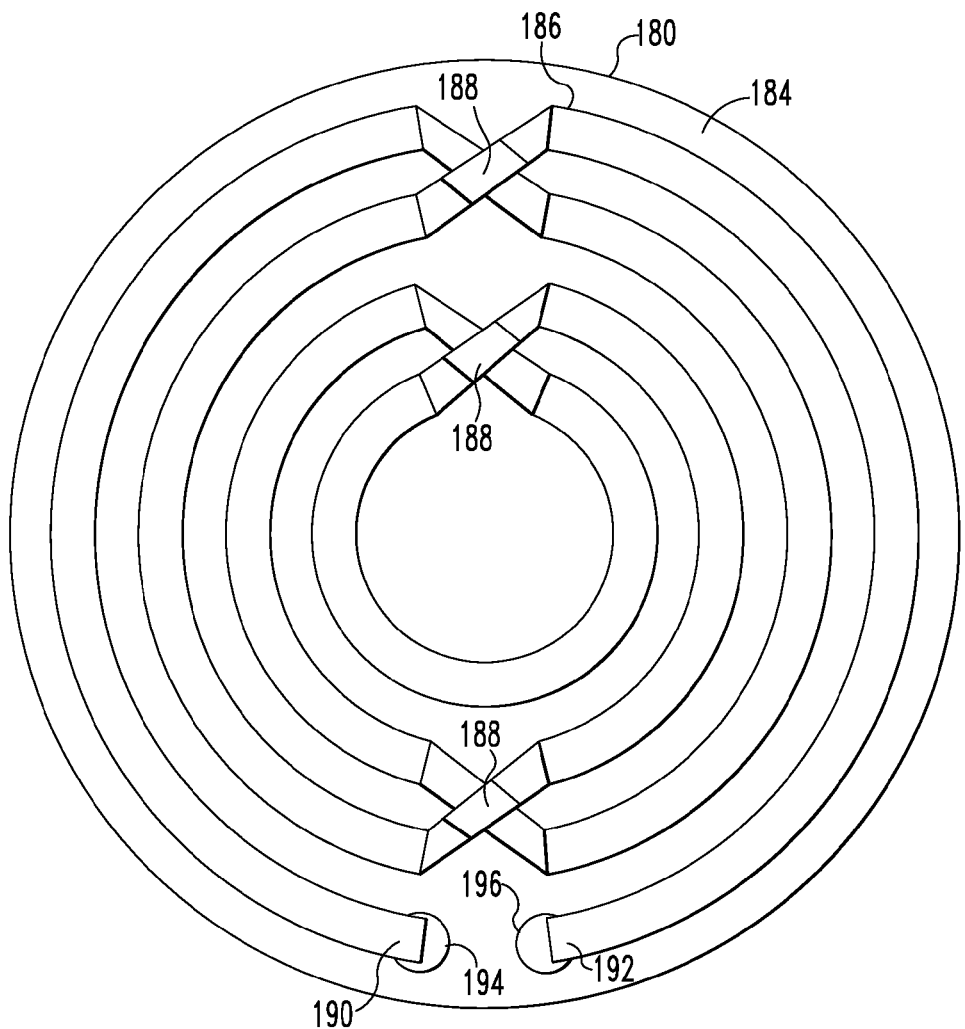
FIG. 21 is a top plan view of the disk-shaped coil element of the multi-layer wireless energy transfer cell shown in FIG. 20.

FIG. 20 is an exploded isometric view of a multi-layer wireless energy transfer cell 20-20 according to still another alternative embodiment. The wireless energy transfer cell 20-20 includes a number of disk-shaped coil elements 180. A top plan view of the disk-shaped coil element 180 is shown in FIG. 21. More specifically, the wireless energy transfer cell 20-20 includes a top disk-shaped coil element 180A, a middle disk-shaped coil element 180B and a bottom disk-shaped coil element 180C. A first insulator disk 182A is provided between the top disk-shaped coil element 180A and the middle disk-shaped coil element 180B, and a second insulator disk 182B is provided between the middle disk-shaped coil element 180B and the bottom disk-shaped coil element 180C. Each insulator disk 182 is made of a suitable insulating material, such as, for example and without limitation, a polymer or a ceramic material. In addition, as seen in FIG. 21, each disk-shaped coil element 180 includes an insulator layer 184 made of a suitable insulating material, such as, for example and without limitation, a polymer or a ceramic material, and a film coil 186 made of a conducting material such as, without limitation, copper (or another suitable metal) film, provided on top of the insulating layer 184. The film coil 186 is formed by making cross-connections 188 in the film coil 186, which results in a symmetric structure with ends (terminals) 190 and 192 positioned adjacent to one another. The insulator layer 184 includes a first conductive via 194 positioned adjacent to the end 190 of the film coil 186 and a second conductive via 196 positioned adjacent to the end 192 of the film coil 186. When assembled in a multi-layered, stacked fashion, a first conductive connector 198 electrically connects the end 190 of the top disk-shaped coil element 180A to the end 192 of the middle disk-shaped coil element 180B through the conductive via 194 of the top disk-shaped coil element 180A and a hole 200 provided in the first insulator disk 182A (this is shown in the exploded, dissembled view of FIG. 20). Similarly, a second conductive connector 202 electrically connects the end 190 of the middle disk-shaped coil element 180*b* to the end 192 of the bottom disk-shaped coil element 180*c* through the conductive via 194 of the middle disk-shaped coil element 180B and a hole 204 provided in the second insulator disk 182B. The film coils 186 and the insulator disks 182 together form an LC resonant tank for the multi-layer wireless energy transfer cell 20-20.

As noted above, by including the cross-connections 188 as shown, the two ends 190, 192 (terminals) of the film coil 186 are at the same location, which facilitates stacking the disk-shaped coil elements 180 and the insulator disk 182 as described. Since all of the disk-shaped coil elements 180 are identical and the film coil 186 of each has a large surface area, there are relatively large distributed capacitances across the insulator disks 182A and 182B. Large capacitances are often desirable in small devices operating at a relatively low resonant frequency. This embodiment is therefore particularly suitable for small devices, such as a medical implant within which this embodiment can be placed on the inside surface of the hermetically sealed cover thereof without taking up significant additional space.

While the embodiment shown in FIGS. 20 and 21 includes disk-shaped coil elements 180, other configurations inducing just two disk-shaped coil elements 180 or four or more disk-shaped coil elements 180 (with the appropriate number of insulator disks 182) are also possible.

Figure 22:
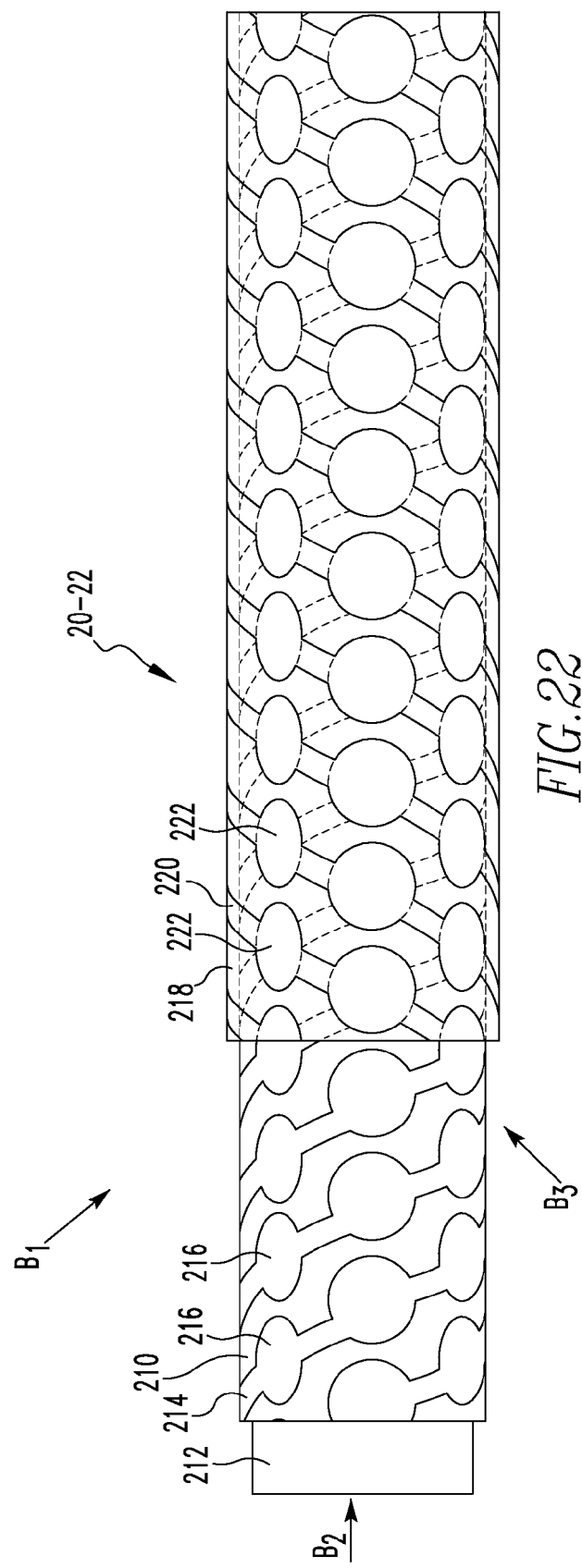
FIG. 22 is partially cut-away top plan view of a cylindrical wireless energy transfer cell according to a further alternative embodiment.

FIG. 22 is top plan view in progressive partial cut-away of a cylindrical multi-layer wireless energy transfer cell 20-22 according to another alternative embodiment. The wireless energy transfer cell 20-22 includes an inner cylindrical insulator 210 made of a suitable insulating material such as, without limitation, a ceramic material or a polymer material. An optional inner cylindrical ferrite core 212 may be provided within the inner cylindrical insulator 210, in which case the inner cylindrical insulator 210 would be in the form of a hollow cylindrical shell. A first spiral conductor coil 214 is provided on the surface of the inner cylindrical insulator 210 along the length thereof. The first spiral conductor coil 214 is preferably made of a conductive film such as, without limitation, a metal film like copper film. The first spiral conductor coil 214 is oriented in either a positive angle or a negative angle with respect to the longitudinal axis of the inner cylindrical insulator 210. The first spiral conductor coil 214 includes a plurality of enlarged portions 216, each preferably in the shape of a disk, provided along the length thereof at predetermined positions. An insulator layer 218 is provided on top of the first spiral conductor coil 214 along the length of the wireless energy transfer cell 20-22. Preferably, the insulator layer 218 is in the form of an insulator film, such as a polymer film. A second spiral conductor coil 220 is provided on the surface of the insulator layer 218 along the length thereof. The second spiral conductor coil 220, like the first spiral conductor coil 214, is preferably made of a conductive film such as, without limitation, a metal film like copper film. The second spiral conductor coil 220 is electrically connected to the first spiral conductor coil 214 and is oriented in either a positive angle or a negative angle with respect to the longitudinal axis of the inner cylindrical insulator 210, wherein, as seen in FIG. 22, the angle (positive or negative) is opposite the angle of the first spiral conductor coil 214. The second spiral conductor coil 220 includes a plurality of enlarged portions 222, each preferably in the shape of a disk, provided along the length thereof at predetermined positions that correspond to and overlap the positions of the enlarged portions 216 of the first spiral conductor coil 214. Thus, the enlarged portions 216 and 220 are provided at the points where the first spiral conductor coil 214 and the second spiral conductor coil 220 overlay and cross over one another. As a result, the enlarged portions 216 and the enlarged portions 222, with the insulator layer 218 in between, form capacitors on the wireless energy transfer cell 20-22. Those capacitors along with the first spiral conductor coil 214 and the second spiral conductor coil 220 together form an LC resonant tank for the cylindrical multilayer wireless energy transfer cell 20-22.

When compared to a traditional solenoid coil, the cylindrical multi-layer wireless energy transfer cell 20-22 has several important properties. First, because of the diagonal orientation of both the first spiral conductor coil 214 and the second spiral conductor coil 220, a much larger elliptic cross-section of the coils may be achieved as compared to the circular cross section of the inner cylindrical insulator 210. In addition, the differently oriented elliptic cross-sections of the first spiral conductor coil 214 and the second spiral conductor coil 220 can respond to magnetic fluxes in all directions effectively (see arrows $B_1$, $B_2$, and $B_3$ in FIG. 22). As a result, the orientations of the transmitting and receiving wireless energy transfer cells (resonators) do not have to be aligned precisely. Depending on particular applications and operating frequencies, the inclusion of the inner cylindrical ferrite core 212 may allow for better attraction of the magnetic field (this works better for lower frequencies). This embodiment is particularly suitable for powering rod-shaped devices, such as, for example and without limitation, small medical implants like a muscle stimulator that can be implanted conveniently by injecting it into the body.

In all the wireless power transfer unit/cell designs previously described, the resonant frequency of the transmitter wireless power transfer unit must be accurately tuned to that of the receiver wireless power transfer unit (or vice versa) in order to achieve the highest energy transfer efficiency. Since the transmitter wireless power transfer unit is typically located in the air, environmental factors, such as the room temperature and moisture, may cause a frequency drift. There may also be environmental factors affecting the stability of the receiver wireless power transfer unit. Therefore, an automatic frequency adjustment circuit may be desirable. In one particular embodiment, a system employing wireless power transfer units as described herein is provided with a frequency tuning function by using a variable capacitance diode, which is a special diode in which the capacitance can be electronically controlled (such diode are also commonly known as varicaps or varactor diodes).

The present inventors have also studied two techniques to enhance energy transfer over a longer distance. The first technique uses a resonant igniter which initiates the coupling between the transmitter wireless power transfer unit and receiver wireless power transfer unit (the dynamic transition of the system has been described previously). The use of the resonant igniter can establish a wireless path of energy transfer more quickly because it sets the initial conditions of the energy transfer system closer to its steady state. The igniter can be implemented by a phase-regulated amplifier which receives and amplifies the signal from the transmitter wireless power transfer unit. The amplified signal drives the LC resonant tank of the receiver wireless power transfer unit into oscillation which is then enhanced progressively by a positive feedback circuit until a full-scale resonance is achieved between the transmitter wireless power transfer unit and receiver wireless power transfer unit. Once the resonant transmission path is fully established, the igniter is temporally disengaged from the system and the receiver wireless power transfer unit starts to receive energy with the established transmission path. In a system with little loss, the established link is enough to keep the system resonating. If losses in the system are too high, the ignition circuit can be re-activated to reignite the transmission path. In the latter case, the ignition circuit starts automatically after a certain period of time or after a certain energy level is detected. The cycles of activation-reception repeat continuously during operation.

The second technique to increase the range of energy transfer is by using an excitation circuit. This technique is similar to that utilized in power stations. It is used to establish a strong magnetic field within the power generator to increase power generating efficiency although excitation itself actually spends power. In the wireless power transfer system, part of the received power is spent to establish a strong, constant oscillation within the LC resonant tank of the receiver wireless power transfer unit, which enhances the power transmission path to the transmitter wireless power transfer unit, enabling the receiver wireless power transfer unit to draw more power from the transmitter wireless power transfer unit. The strength of excitation is optimally adjusted so that the net energy, which equals the energy received minus the energy spent, is higher than that without using excitation, and is maximized.

Both the frequency tuning and igniting circuits can be implemented within the wireless power transfer unit or cell or the parent device. These circuits are powered by the power source within the parent device.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A wireless energy transfer unit having at least one resonant frequency, comprising:
    an energy coupling/extraction coil; and
    a wireless energy transfer cell magnetically coupled to said energy coupling/extraction coil, said wireless energy transfer cell comprising an LC resonant tank including at least one insulator having a first surface and a second surface opposite said first surface, a spiral conductor coil provided on said first surface of said at least one insulator, and a plurality of non-spiral conductive strips provided, on said second surface of said at least one insulator, wherein said spiral conductor coil, said at least one insulator and said plurality of non-spiral conductive strips form at least one capacitor of said LC resonant tank.

2. The wireless energy transfer unit according to claim 1, wherein said energy coupling/extraction coil comprises a single loop coil.

3. The wireless energy transfer unit according to claim 1, wherein said energy coupling/extraction coil comprises a plurality of loops.

4. The wireless energy transfer unit according to claim 1, wherein each of said non-spiral conductive strips overlaps a plurality of turns of said spiral conductor coil.

5. The wireless energy transfer unit according to claim 4, wherein said at least one insulator is a cylindrical insulator, wherein said conductor coil is a helical conductor coil.

6. The wireless energy transfer unit according to claim 5, wherein each of said conductive strips covers only two adjacent portions of said helical conductor coil.

7. The wireless energy transfer unit according to claim 1, wherein said at least one insulator is a flat insulator, wherein said spiral conductor coil is a flat conductor coil and wherein each of said plurality of non-spiral conductive strips is a flat conductive strip.

8. The wireless energy transfer unit according to claim 7, wherein said spiral conductor coil is a square spiral.

9. The wireless energy transfer unit according to claim 7, wherein said spiral conductor coil is a circular spiral.

10. The wireless energy transfer unit according to claim 7, wherein said conductor coil includes a plurality of crisscrossing portions along a length thereof such that a beginning and an end of the conductor coil are positioned adjacent to one another.

11. The wireless energy transfer unit according to claim 5, wherein said conductor coil includes a plurality of crisscrossing portions along a length thereof such that a beginning and an end of the conductor coil are positioned adjacent to one another.

12. A wireless energy transfer unit having at least one resonant frequency, comprising:
    an energy coupling/extraction conductor; and
    a multi-layer wireless energy transfer cell magnetically coupled to said energy coupling/extraction conductor, said multi-layer wireless energy transfer cell comprising:
    a top layer and a bottom layer, said top layer and said bottom layer being made of a magneto-electric material that produces an electric field when exposed to a magnetic field;
    a first conductor layer forming a first electrode positioned adjacent to said top layer;
    a second conductor layer forming a second electrode positioned adjacent to said bottom layer; and
    a central layer positioned between said first conductor layer and said second conductor layer, said central layer being made of a piezoelectric material which resonates in response to a electric field being applied thereto by said first conductor layer and said second conductor layer.

13. A wireless energy transfer unit having at least one resonant frequency, comprising:
    an energy coupling/extraction conductor; and
    a multi-layer wireless energy transfer cell magnetically coupled to said energy coupling/extraction conductor, said multi-layer wireless energy transfer cell comprising:
    a first coil element including a first insulator layer and a first conductor coil provided on said first insulator layer, said first conductor coil including a plurality of first crisscrossing portions along a length thereof such that a first beginning and a first end of said first conductor coil are positioned adjacent to one another;
    a second coil element including a second insulator layer and a second conductor coil provided on said second insulator layer, said second conductor coil including a plurality of second crisscrossing portions along a length thereof such that a second beginning and a second end of said second conductor coil are positioned adjacent to one another; and
    an insulator element made of an insulating material provided between said first coil element and said second coil element;
    wherein said first coil element and said second coil element are electrically connected to one another.

14. The wireless energy transfer unit according to claim 13, wherein said first coil element and said second coil element are electrically connected to one another through said insulator element.

15. The wireless energy transfer unit according to claim 14, wherein said first beginning of said first coil element is electrically connected to said second end of said second coil element.

16. The wireless energy transfer unit according to claim 13, wherein said multi-layer wireless energy transfer cell further comprises:
    a third coil element including a third insulator layer and a third conductor provided on said third insulator layer, said third conductor coil including a plurality of third crisscrossing portions along a length thereof such that a third beginning and a third end of said third conductor coil are positioned adjacent to one another; and
    a second insulator element made of an insulating material provided between said second coil element and said third coil element;
    wherein said second coil element and said third coil element are electrically connected to one another.

17. The wireless energy transfer unit according to claim 16, wherein said first coil element and said second coil element are electrically connected to one another through said insulator element and said second coil element and said third coil element are electrically connected to one another through said second insulator element.

18. The wireless energy transfer unit according to claim 17, wherein said first beginning of said first coil element is electrically connected to said second end of said second coil element, and said second beginning of said second coil element is electrically connected to said third end of said third coil element.

19. The wireless energy transfer unit according to claim 13, wherein said first coil element, said second coil element and said insulator element are disk-shaped.

20. The wireless energy transfer unit according to claim 16, wherein said first coil element, said second coil element, said third coil element, said insulator element, and said second insulator element are disk-shaped.

21. The wireless energy transfer unit according to claim 13, wherein said first conductor coil and said second conductor coil are each film coils.

22. The wireless energy transfer unit according to claim 13, wherein said first conductor coil, said second conductor coil and said third conductor coil are each film coils.

23. A wireless energy transfer unit having at least one resonant frequency, comprising:
- an energy coupling/extraction conductor; and
- a multi-layer cylindrical wireless energy transfer cell magnetically coupled to said energy coupling/extraction conductor, said multi-layer cylindrical wireless energy transfer cell comprising:
- an inner cylindrical insulator;
- a first spiral conductor coil provided on a surface of said inner cylindrical insulator;
- an insulator layer provided on top of said first spiral conductor coil; and
- a second spiral conductor coil provided on a surface of said insulator layer, said second spiral conductor coil being electrically connected to said first spiral conductor coil.

24. The wireless energy transfer unit according to claim 23, wherein said first spiral conductor coil is oriented in one of a positive angle and a negative angle with respect to a longitudinal axis of said inner cylindrical insulator, and wherein said second spiral conductor coil is oriented in the other of said positive angle and said negative angle with respect to said longitudinal axis of said inner cylindrical insulator.

25. The wireless energy transfer unit according to claim 24, wherein said first spiral conductor coil includes a plurality of first enlarged portions along a length thereof, wherein said second spiral conductor coil includes a plurality of second enlarged portions along a length thereof, and wherein each of said second enlarged portions corresponds to and overlaps a respective one of said first enlarged portions.

26. The wireless enemy transfer unit according to claim 25, wherein each of said first enlarged portions and each of said second enlarged portions is disk-shaped.

27. The wireless energy transfer unit according to claim 23, wherein said multi-layer cylindrical wireless energy transfer cell further comprises a ferrite core provided inside said inner cylindrical insulator.

* * * * *

UNITED STATES PATENT AND TRADEMARK OFFICE
CERTIFICATE OF CORRECTION

PATENT NO. : 8,421,274 B2
APPLICATION NO. : 12/556828
DATED : April 16, 2013
INVENTOR(S) : Mingui Sun et al.

It is certified that error appears in the above-identified patent and that said Letters Patent is hereby corrected as shown below:

In the Specifications:
Column 6, line 56, "that" should read --than--.
Column 8, line 18, "provides, a" should read --provides a--.
Column 8, line 19, "unit is provided that" should read --unit that--.
Column 9, line 43, "describe" should read --described--.
Column 9, line 50, "describe" should read --described--.
Column 9, line 58, "describe" should read --described--.
Column 10, line 13, "a block diagrams" should read --block diagrams--.
Column 10, line 45, "employed, herein," should read --employed herein,--.
Column 11, line 58, "thereof The" should read --thereof. The--.
Column 15, line 10, " $sin\ h(l_1\sqrt{Z_1Y})tan\ h(l_1\sqrt{Z_1Y}/2) = -2$ . (10) ,,
should read -- $\sinh(l_1\sqrt{Z_1Y})\tanh(l_1\sqrt{Z_1Y}/2) = -2$ . (10) --.
Column 16, line 17, "in the" should read --in--.
Column 16, line 45, " $sin\ h(l\sqrt{Z_1Y})tan\ h(l\sqrt{Z_1Y}/2) = -1$ , (14) ,,
should read -- $\sinh(l\sqrt{Z_1Y})\tanh(l\sqrt{Z_1Y}/2) = -1$ , (14) --.
Column 17, line 40, "foil" should read --coil--.
Column 17, line 41, "foil" should read --coil--.
Column 17, line 49, "foil" should read --coil--.
Column 17, line 50, "foil" should read --coil--.
Column 17, line 63, "foil" should read --coil--.
Column 24, line 52, "is top" should read --is a top--.
Column 26, line 2, "diode" should read --diodes--.

In the Claims:
Column 30, line 15, Claim 26, "enemy" should read --energy--.

Signed and Sealed this
Sixth Day of August, 2013

Teresa Stanek Rea
*Acting Director of the United States Patent and Trademark Office*